United States Patent [19]

Hammer et al.

[11] Patent Number: 5,058,056
[45] Date of Patent: Oct. 15, 1991

[54] WORKSTATION TAKEOVER CONTROL

[75] Inventors: William E. Hammer; Harold F. Kossman, both of Rochester, Minn.

[73] Assignee: International Business Machines Corporation

[21] Appl. No.: 681,653

[22] Filed: Apr. 8, 1991

Related U.S. Application Data

[63] Continuation of Ser. No. 861,660, May 5, 1986, abandoned, which is a continuation of Ser. No. 531,114, Sep. 12, 1983, abandoned.

[51] Int. Cl.⁵ .............................................. G06F 15/16
[52] U.S. Cl. .................................. 364/900; 364/926.9; 364/931.4; 364/940.0; 364/940.1; 364/949.4
[58] Field of Search ... 364/200 MS File, 900 MS File

[56] References Cited

U.S. PATENT DOCUMENTS

| | | | |
|---|---|---|---|
| 3,303,474 | 1/1963 | Moore et al. | 340/172.5 |
| 3,593,302 | 3/1968 | Salto et al. | 340/172.5 |
| 3,864,670 | 2/1973 | Inoe et al. | 340/172.5 |
| 4,266,271 | 5/1981 | Chamoff et al. | 364/200 |
| 4,276,593 | 6/1981 | Hansen | 364/187 X |
| 4,320,508 | 3/1982 | Takezoe | 371/11 X |
| 4,351,023 | 9/1982 | Richer | 364/134 X |
| 4,402,082 | 8/1983 | Cope | 371/11 X |
| 4,466,098 | 8/1984 | Southard | 371/9 |
| 4,484,273 | 11/1984 | Stiffler et al. | 364/200 |
| 4,500,951 | 2/1985 | Sugimoto et al. | 364/186 |
| 4,527,235 | 7/1985 | Chebra | 364/200 |

Primary Examiner—Thomas C. Lee
Assistant Examiner—William M. Treat
Attorney, Agent, or Firm—Blaney Harper; Bradley A. Forrest; Donald F. Voss

[57] ABSTRACT

Workstations are connected via workstation controllers to two computer systems where one of the workstation controllers is a primary or controlling workstation controller and the other workstation controller is connected to appear to the primary workstation controller as a workstation and is designated as the secondary or standby workstation controller. The standby workstation controller has its line impedance matching resistor connected to function as a line terminator but it can also function as a line driver resistor when the primary or controlling workstation controller fails, the failure of the primary or controlling workstation controller being detected by the secondary or standby workstation controller upon the failure of being polled by the primary or controlling workstation controller within a predetermined period of time. The line impedance matching resistor of the failing primary or controlling workstation controller then functions as a line terminator resistor. The primary or controlling workstation controller and the secondary or standby workstation controller are connected backwards with respect to the connection of workstation to workstation whereby the line impedance matching resistor of the workstation adjacent to the filing primary or controlling workstation controller can function as a line terminating resistor to permit the failing workstation controller to be removed from the system for repair without creating a line termination problem for the workstations and the standby workstation controller which has become the controlling workstation controller.

12 Claims, 25 Drawing Sheets

WORKSTATION TAKEOVER CONTROL

This is a continuation of application Ser. No. 06/861,660, filed May 5, 1986, and now abandoned, which is a continuation of application Ser. No. 531,114, filed Sept. 12, 1983, now abandoned.

BACKGROUND OF THE INVENTION

1. Field of the Invention

This invention relates to apparatus for providing high availability of workstations in a computer system and more particularly, to workstation takeover control apparatus in a high availability computer system including a primary host computer, a primary or controlling workstation controller, a plurality of workstations, a secondary host or standby computer, and a secondary workstation controller.

The invention finds particular utility in a computer system which requires backup over workstations and workload of the computer system.

2. Description of the Prior Art

The prior art such as U.S. Pat. Nos. 3,303,474; 3,593,302 and 3,864,670 is directed to an arrangement where a common piece of hardware monitors operation and detects errors in one of the computers and switches to the operable computer. In the present invention there is no single element in the data path that is subject to failure. The monitoring functions are in each system so that most single failures are prevented from making the entire system inoperable. In the present invention, a secondary or standby workstation controller is connected to appear to the primary or controlling workstation controller as a workstation in a manner to eliminate the need to change the interconnections by taking advantage of the cable-through feature when the secondary workstation controller is caused to function as a workstation controller upon the failure of the primary workstation controller. The secondary workstation controller's driver resistors are connected to function as terminators but can also function as driver resistors when the secondary workstation controller functions as a workstation controller, i.e., becomes the primary workstation controller.

SUMMARY OF THE INVENTION

The principal objects of the invention are to provide the ability to attach workstations to multiple computers to provide high availability of system resources to the workstation users. A primary workstation controller is connected to a primary host computer and to a plurality of workstations. A secondary workstation controller is connected to a secondary host computer and is also connected to the plurality of workstations in a manner to be pollable by the primary workstation controller. When the primary workstation controller fails, the failure being detected by the secondary workstation controller when it has not been polled by the primary workstation controller within a predetermined period of time, the secondary workstation controller switches to function as a workstation controller over the workstations and the impedance matching resistors of the failing primary workstation controller function as a terminating resistor. The connections of the primary and secondary workstation controllers to the adjacent workstations are backwards relative to the connection of one workstation to successive workstations. The line impedance matching resistor thus functions as a driver resistor when the workstation controller is in the controller mode and functions as a line terminating resistor when the workstation controller is in the standby mode.

DESCRIPTION OF THE INVENTION

Figure 1:
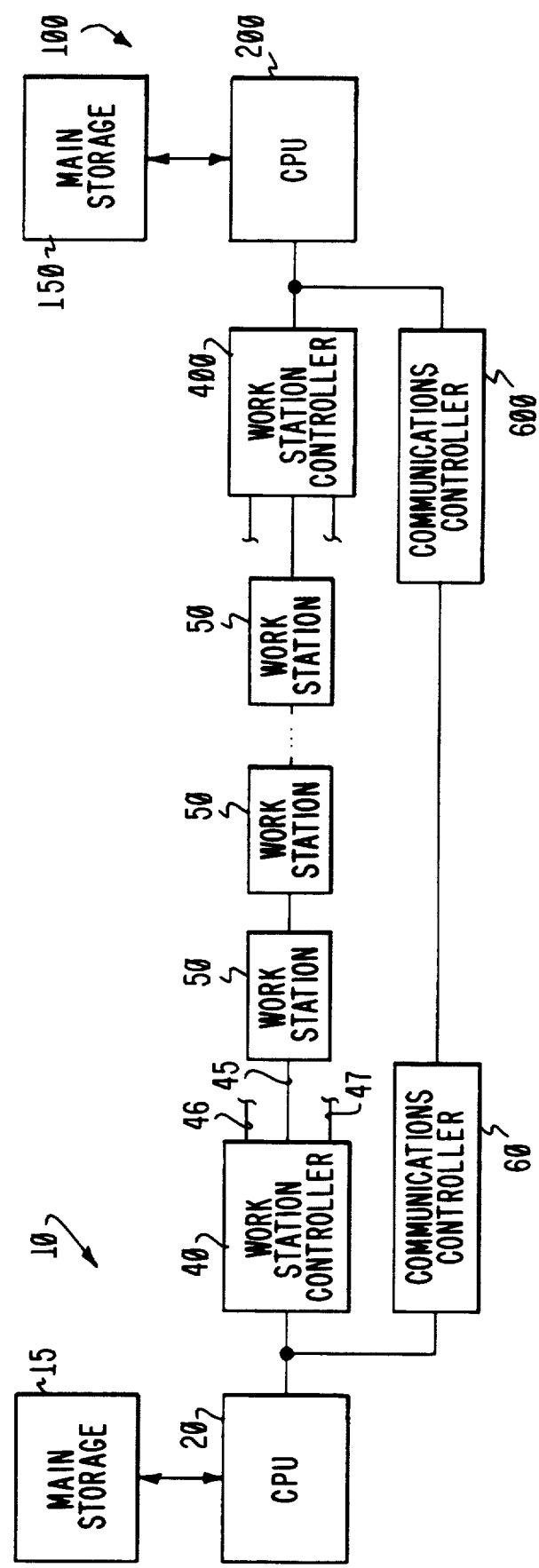
FIG. 1 is a block diagram showing the invention incorporated into a computer system having a primary host computer, a primary or controlling workstation controller, a plurality of workstations, a secondary host computer and a secondary or standby workstation controller with a communications link between the primary and secondary computers.

With reference to the drawings and particularly to FIG. 1, the invention is illustrated by way of example as being incorporated in a system where workstations 50 are attached to multiple computers 10 and 100. Computer 10 in this example consists of main storage 15 and central processing unit (CPU) 20. Similarly computer 100 consists of main storage 150 and central processing unit (CPU) 200. Whether or not computers 10 and 100 have separate storages 15 and 150 respectively is immaterial to the present invention, and the computers 10 and 100 could share a common storage in a well known tightly coupled arrangement.

Workstation controller 40 is attached to the CPU 20, and workstation controller 400 is attached to CPU 200.

The computer systems 10 and 100 communicate with each other via communications controllers 60 and 600. In this example workstation controller 40 is designated as the primary workstation controller for controlling workstations 50, and workstation controller 400 is the standby or secondary workstation controller. Computer systems 10 and 100 are designated as primary host and secondary host computers respectively relative to workstations 50.

The workstation controllers 40 and 400 receive poll lists in a conventional manner. The host systems 10 and 100 send commands to the workstation controllers 40 and 400 for loading the poll list. The workstation controllers 40 and 400 then execute the commands by retrieving the poll lists from main storage 15 and 150 respectively. The workstation controllers 40 and 400 store the poll lists in their storages which will be described in greater detail in connection with FIGS. 5a, 5b and 5c. The primary and secondary modes are set in accordance with the states of control bits in the load poll list command. Except for these control bits, the load poll list commands are identical.

As the workstation controllers 40 and 400 complete the execution of the load poll list command they will start to poll the workstations 50 and in this instance only the active workstation controller, i.e. workstation controller 40, will be polling the workstations 50 and additionally will be polling workstation controller 400 in the same manner that it polls the workstations 50.

The workstation controller 400 could have been active and thus workstation controller 40 after receiving or retrieving the poll list from the host processor 20, monitors port 45 of FIG. 1 for activity. Normally there should be no activity or signals on the port 45 at this time. If there are signals on port 45 they would be indicative that either workstation controller 400 is operating as an active workstation controller or that one of the workstations 50 is inoperative.

Figure 8A:
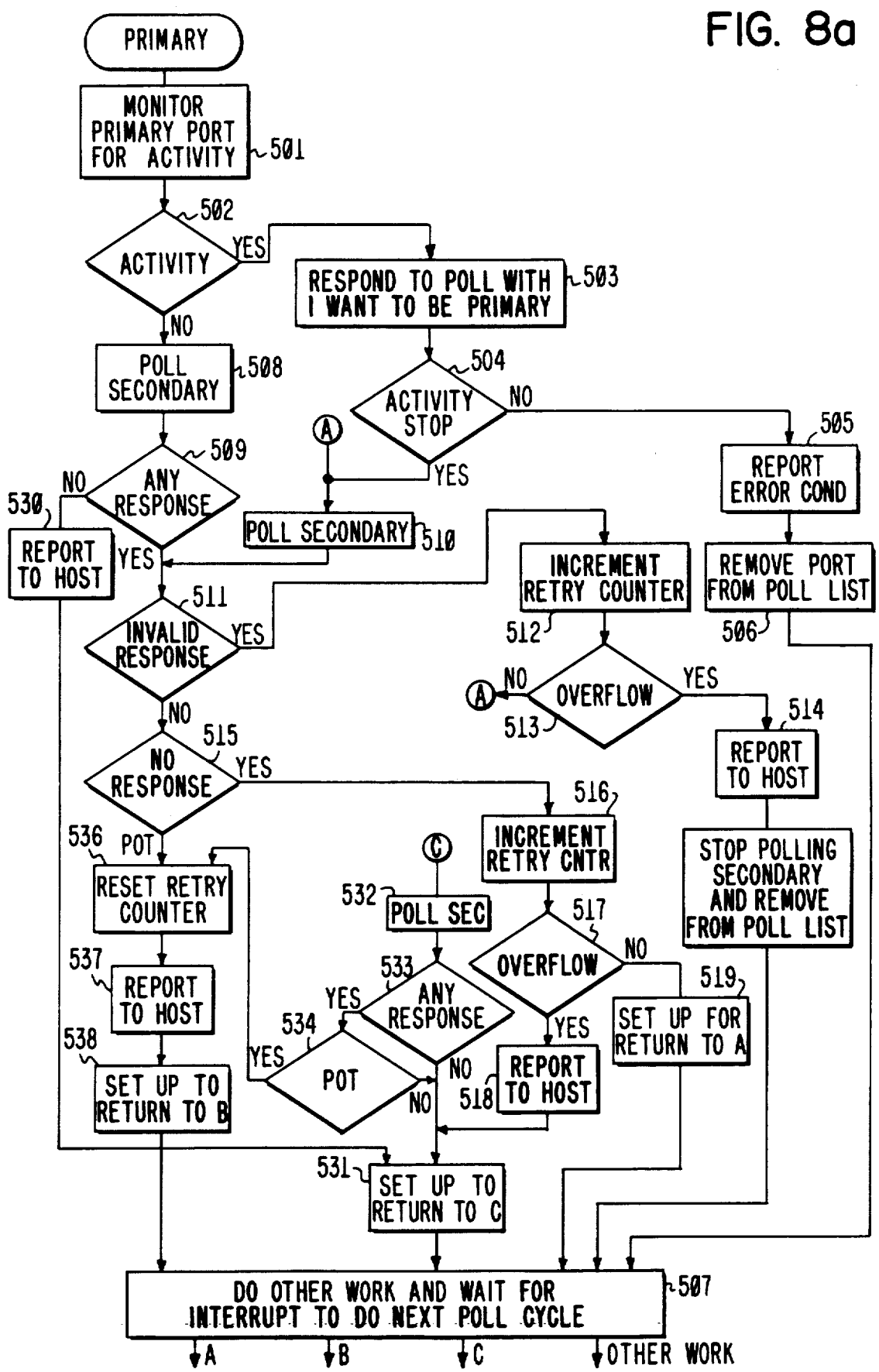
FIGS. 8a and 8b with FIG. 8a disposed to the left of FIG. 8b, taken together are a flow diagram of the operations performed by a primary workstation controller.

The monitoring of port 45 by workstation controller 40 is indicated by block 501 of FIG. 8a. The test for activity by workstation controller 40 is indicated by block 502. If there is activity, workstation controller 40 is in essence being polled by workstation controller 400, and it responds to the poll with a response indicating that workstation 40 wants to be the primary workstation. This is indicated by block 503. Workstation controller 40 then continues to monitor port 45 to see if activity has stopped, i.e. determines if workstation controller 400 went into a standby or secondary mode as determined by block 504. If workstation controller 400 did not go into the standby mode and there is still activity at port 45, workstation controller 40 reports an error condition to its host CPU 20 indicating that the workstation controller 400 is keeping the port busy as indicated by block 505. Workstation controller 40 can remove port 45 from its poll list and work with ports 46 and 47, for example, which would be connected to other workstations not shown. This action is indicated by block 506.

If the activity had stopped as indicated by block 504, then workstation controller 40 polls the workstation controller 400 as a secondary or standby workstation controller as indicated by block 510. Workstation controller 40 then looks for a response from workstation controller 400 as indicated by block 511. This function is also reached when block 502 determines that there was no activity at all at port 45. When that condition exists workstation controller 40 polls workstation controller 400 as indicated by block 508. If there is a response from workstation controller 400, the test for a response being indicated by block 509, then the validity of the response is tested by block 511. If there were no response then workstation controller 40 reports that fact to host CPU 20 as indicated by block 530. Workstation controller 40 in this instance sends a message to CPU 20 indicating that the secondary or standby workstation controller 400 does not respond to polls. This could be a normal condition, i.e. workstation controller 400 has not been switched to secondary or standby status or is in the process of doing so.

Block 531 sets up for return to block 532, i.e. return to C. The return to block 532 is determined by workstation controller 40 which can be doing other work such as polling workstations 50 or polling ports 46 and 47. Block 532 is indicative that workstation controller 40 is polling standby workstation controller 400 and block 533 checks for a response from workstation controller 400. If there is no response again from workstation 400, block 531 sets up a return for polling by block 532. If there is a response from workstation controller 400, block 534 checks to determine if the response is a power on transition (POT) response which indicates that the secondary or standby workstation controller 400 is responding to the first poll that the workstation controller 400 has detected. If the response is other than a power on transition response, the response could be indicative of a line noise condition, then the operation switches to block 531.

If the response is a power on transition response then workstation controller 40 resets its retry counter as indicated by clock 536. Workstation controller 40 then sends a message to host CPU 20 indicating to CPU 20 that the secondary or standby workstation controller 400 responded to a poll. This is indicated by block 537. Workstation controller 40 has now established that there is a good communication link with secondary workstation controller 400, and it then sets up a return to point B of FIG. 8b as indicated by block 538, the return being via block 507. Workstation controller 40 can now poll the secondary workstation controller 400 as a functioning workstation, and this occurs whenever workstation controller 40 returns to point B.

If there has been a response from the secondary workstation controller 400 as determined by block 509, FIG. 8a, then block 511 would check to determine if the response were valid. If there were an invalid response at this time from workstation controller 400, block 512 would increment the retry counter in workstation controller 40. The retry counter is a programmable counter in the workstation controller 40, and it is programmed for a predetermined number of retries. Block 513 tests for an overflow from the retry counter, and if there is no overflow the operation switches back to block 510 for another poll of the secondary workstation controller 400. If there is an overflow of the retry counter then workstation controller 40 reports this condition to CPU 20 as indicated by block 514. The workstation controller 40 reports that the secondary workstation controller's response to polls is invalid after the predetermined number of retries. Workstation controller 40 stops polling workstation controller 400 and removes it from the poll list.

If block 511 determines that the response is valid or that there is no invalid response, then because block 511 can be entered from two sources, block 515 checks for a response condition. If there is no response as detected by block 515 then the retry counter in workstation controller 40 is incremented as indicated by block 516. Block 517 checks for an overflow condition. If there is an overflow of the retry counter the workstation controller 40 reports it to host CPU 20 as indicated by block 518, and the message in this instance is that the secondary workstation controller 400 doesn't respond to polls. Workstation controller 40 then sets up a return to point C. If the retry counter did not overflow as detected by block 517, workstation controller 40 would set up a return to A as indicated by block 519.

The invalid conditions and the looping for poll responses has been described. When workstation controller 40 returns to point B, it will poll the secondary workstation controller 400 as indicated by block 540 of FIG. 8b. The function of polling the secondary workstation controller 400 at this time, i.e. after it has been determined that secondary or standby workstation controller 400 has come back with a power on transition response, is to provide a means for determining if the workstation controller 40 has developed a condition whereby standby workstation controller 400 should take over. Block 541 tests to see if the secondary or standby workstation controller 400 is responding properly, i.e. the secondary workstation controller 400 provides a link level poll response indicating that it is okay. The workstation controller 40 in response to receiving a secondary okay response resets the error or retry counter as indicated by block 542. Workstation controller 40 then sets up a return to B as indicated by block 543, and the operation switches to block 507 which is repeated on FIG. 8b for clarity.

Figure 9:
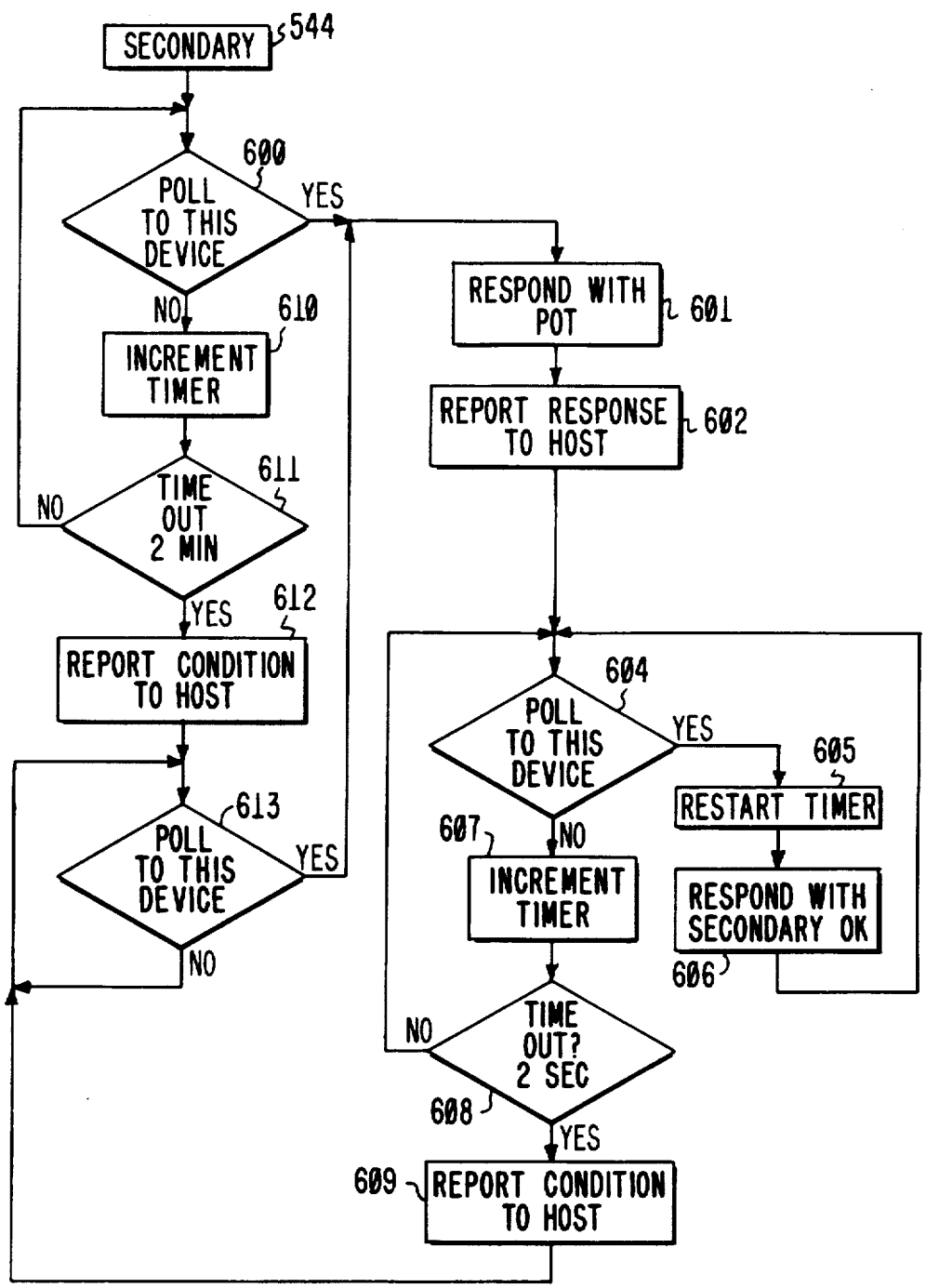
FIG. 9 is a flow diagram of the operations performed by a secondary workstation controller.

If block 541 detects an error condition which would be a response other than secondary okay, then workstation controller 40 checks to determine if the secondary workstation controller 400 wants to be a primary workstation controller. This check is made by block 544. If workstation controller 40 detects that the response is one where the secondary workstation controller 400 wants to be a primary workstation controller then workstation controller 40 reports a message to the host CPU 20 indicating that fact as indicated by block 545. Although the workstation controller 40 reports this message to the host CPU 20, workstation controller 40 enters the secondary mode as indicated by block 546. This secondary mode is set forth in FIG. 9.

It should be understood that the operation in the secondary or standby workstation controller 400 is taking place at the same time that workstation controller 40 is operating. In this particular example workstations 40 and 400 are identical in the sense that both can be either a primary or secondary workstation controller. Thus the secondary or standby workstation controller 400 is operating to determine if it has been polled. Block 600, FIG. 9, tests for the poll, and if a poll has been received, the secondary workstation controller 400 responds with a power on transition (POT) as indicated by block 601. Workstation controller 400 also responds to its host processor 200 with a message that the primary workstation controller 40 has started polling. This is indicated by block 602. The secondary workstation controller 400 then starts a two second timer. The function of the timer is to insure that the secondary workstation controller is polled every two seconds. By this arrangement a check is made to determine if the primary workstation controller 40 is still operable.

Block 604 looks for a poll, and if one is received the secondary workstation controller 400 restarts the two second timer as indicated by block 605. The secondary workstation controller 400 then responds to the primary workstation controller 40 with a message indicating that the secondary workstation controller 400 is okay as indicated by block 606.

If block 604 determines that there was no poll, the two second timer is incremented as indicated by block 607 and then a check is made to see if there is a two second timeout as indicated by block 608. If there is no two second timeout the operation loops back to block 604 but if there is one, then the secondary workstation controller 400 reports the condition to host processor 200 as indicated by block 609. The secondary workstation controller 400 would report that the primary workstation controller 40 stopped polling.

When the workstation controller 400 reports that the primary workstation controller 40 has stopped polling, the workstation controller 400 continues to look for a poll as indicated by block 613. One of two conditions could exist. The primary workstation controller 40 could start polling again, and if so the operation switches to block 601. If the primary workstation controller 40 does not poll, then the secondary workstation controller 400 remains in the loop looking for a poll and will stay in this loop until some other action is taken. The CPU 200 would make the workstation controller 400 a primary workstation controller where the workstation controller 400 would start its operation indicated by block 501 of FIG. 8a.

It should be noted that when the secondary workstation controller 400 was looking for a poll, if none occurred, it incremented a two minute timer as indicated by block 610, and then a check is made to determine if there is a two minute timeout as indicated by block 611. If there is no two minute timeout the operation switches back to block 600. If there is a two minute timeout the condition is reported to the host CPU 200. The workstation controller 400 reports that the primary workstation controller 40 did not start polling within two minutes.

It should be recognized that the primary workstation controller 40 can switch to a secondary workstation controller in response to a message received from the secondary workstation controller 400 indicating that it wants to be a primary workstation controller. This would occur for example when CPU 200 communicates with CPU 20 via the communications controllers 600 and 60 and gets no response from CPU 20. If there is a problem with CPU 20 it is unable to switch workstation controller 40 from a primary to a secondary workstation controller. Thus the switching is effected by CPU 200 indicating to workstation controller 400 that it should become a primary workstation controller. Workstation controller 400 then sends the appropriate message to workstation controller 40 indicating that it wants to be a primary workstation controller.

Figure 8B:
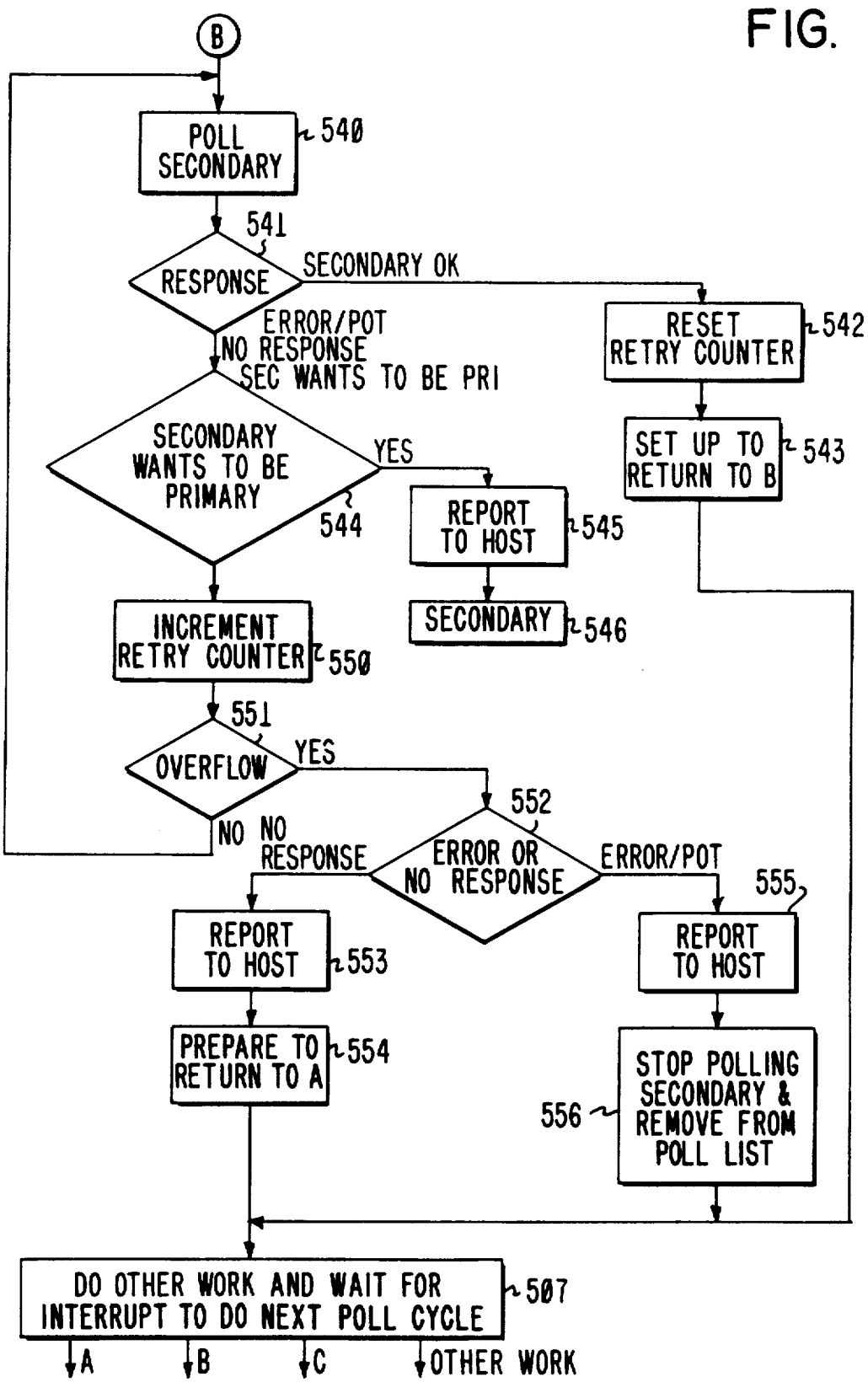

When block 544 of FIG. 8b checks to see if the response was that the secondary workstation controller 400 wants to be a primary workstation controller, and if the response is negative, the workstation controller 40 increments the retry counter as indicated by block 550. Block 551 checks to see if the retry counter has overflowed, and if it has not the operation switches back to block 540. If the retry counter has overflowed block 552 checks for an error or no response. If the condition is no response the workstation controller 40 reports that the secondary workstation controller 400 has stopped responding to polls. The workstation controller 40 then prepares a return to point A in FIG. 8a. If there is an error the workstation controller 40 reports to the CPU 20 that the secondary workstation controller 400 response to the polls is invalid after a predetermined number of retries. This reporting is indicated by block 555. The workstation controller 40 then stops polling the secondary workstation controller 400 and removes it from the poll list as indicated by block 556. The workstation controller 40 then switches to block 507 and can do other work, i.e. continue polling workstations 50 but not workstation controller 400.

Figures 10, 10A:
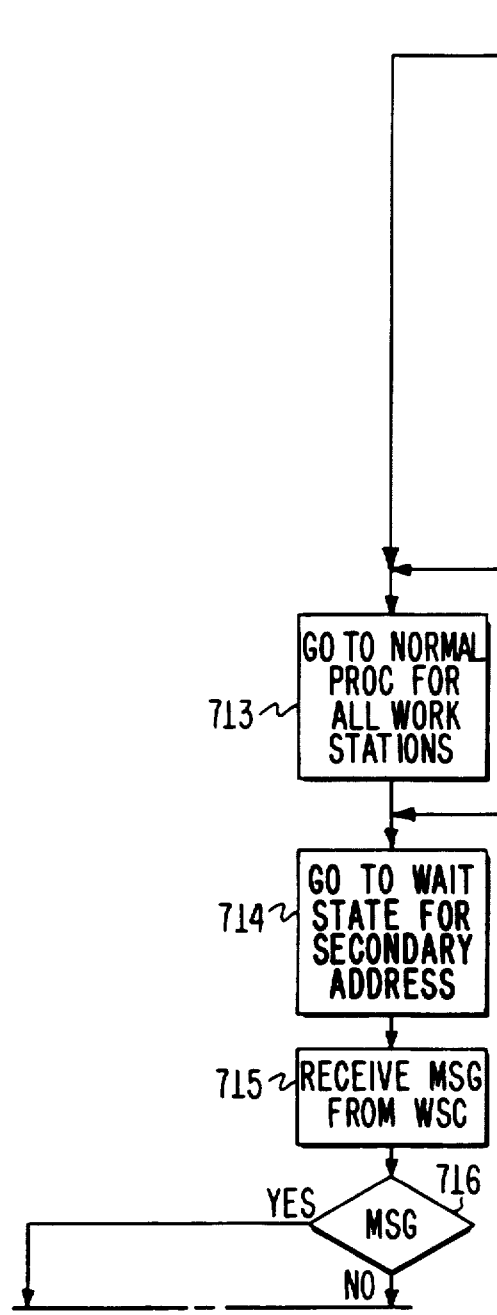
FIGS. 10a, 10b, 10c, 10d, 10e and 10f taken together as in FIG. 10 are a flow diagram of the operations performed by primary and secondary host central processing units.
FIG. 10 shows the arrangement of FIGS. 10a, 10b, 10c, 10d, 10e and 10f.

The processors 20 and 200 each have the capability of performing the functions set forth in the flow diagram of FIG. 10. Processors 20 and 200 issue the load poll list command to the respective workstation controllers 40 and 400 as indicated by block 710 of FIG. 10a. Thereafter, the processors 20 and 200 set a machine state corresponding to the designations of the workstation controllers 40 and 400 as indicated by block 711. In this example CPU 20 would set the machine state to primary and CPU 200 would set the state to secondary. The next action would be to test the state as indicated by block 712.

When the state is set to primary the next action is to proceed to normal processing for all workstations as indicated by block 713. The action for the secondary state is to go to a wait state as indicated by block 810 of FIG. 10c. Thus assuming processor 20 has set itself to the primary state it would then go to a wait state for this function. The processor 20 of course would be doing other work while this function is in the wait state. Processor 20 is taken out of the wait state for this function when it is passed the address of the secondary workstation controller 400 by the workstation controller 40 where this action is indicated by block 714. With this function out of the wait state the next action is to receive messages from the workstation controller 40 as indicated by block 715.

Block 716 tests for the type of message sent by the workstation controller 40 and in particular tests to see if the message is to the effect that the secondary workstation controller 400 started responding to polls with a power on transition (POT) response. If that is the message then the function again goes to the wait state as indicated by block 717 of FIG. 10d. Otherwise a test is made by block 718, FIG. 10a, to determine if the message is one where the secondary workstation controller 400 didn't respond to polls from the workstation controller 40. If the message is that the secondary workstation controller 400 did not respond to polls from the primary workstation controller 40 then the processor 20 sets a three minute programmable timer. If the message was not of that type then another test is made as indicated by block 719, FIG. 10b, to determine if the message sent to CPU 20 by workstation controller 40 is to the effect that the secondary workstation controller 400 is keeping the port 45 busy. If that is the message then processor 20 performs a function whereby it sends a message via its communications controller 60 and the communications controller 600 to CPU 200 requesting that CPU 200 issue a command to workstation controller 400 for that workstation controller to stop operating. If the message is not of that type then the CPU 20 makes another test as indicated by block 720, FIG. 10e, to determine if the message was to the effect that the secondary workstation controller's response to polls is invalid after a predetermined number of retries.

Figure 10B:
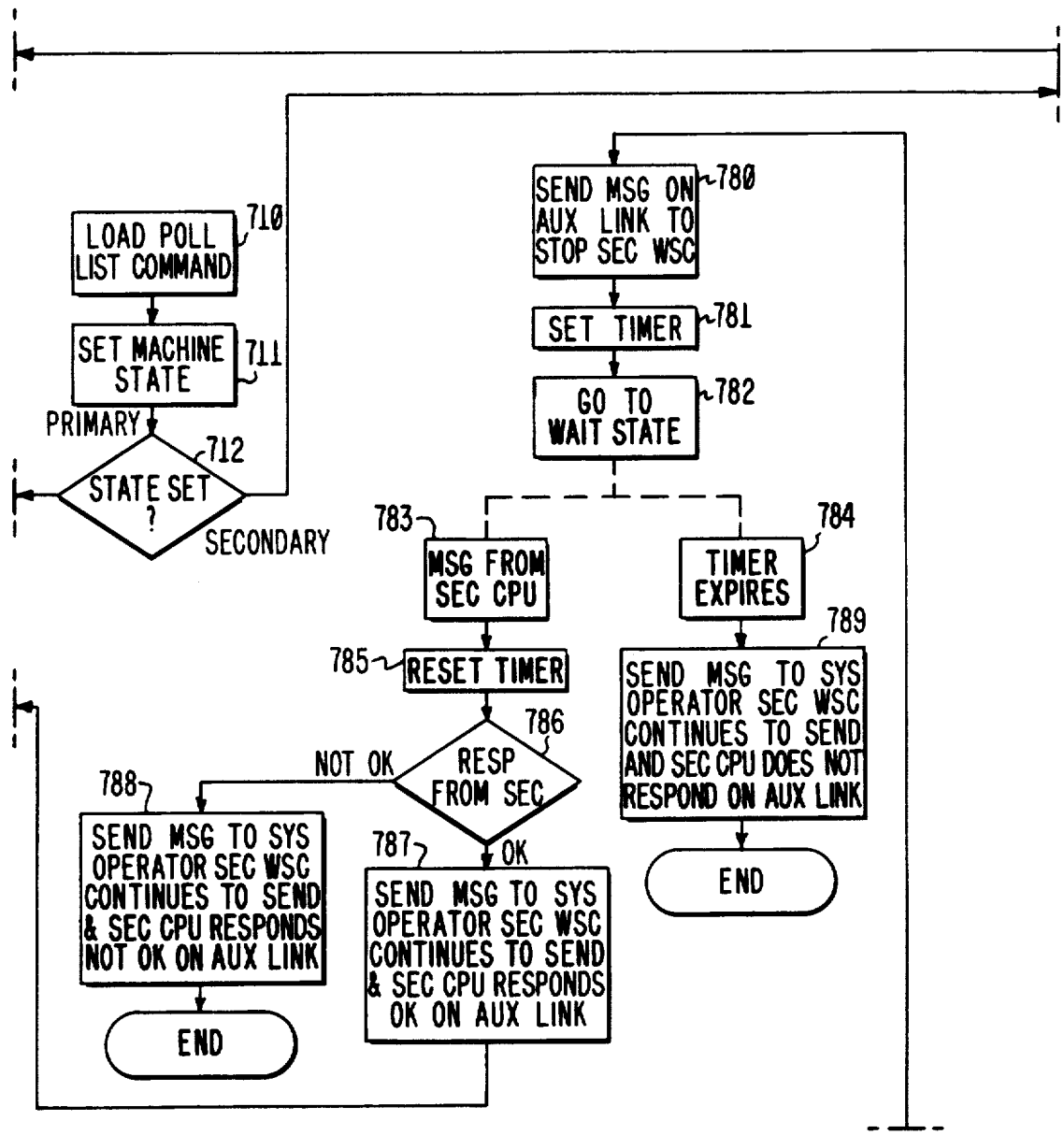
Figure 10C:
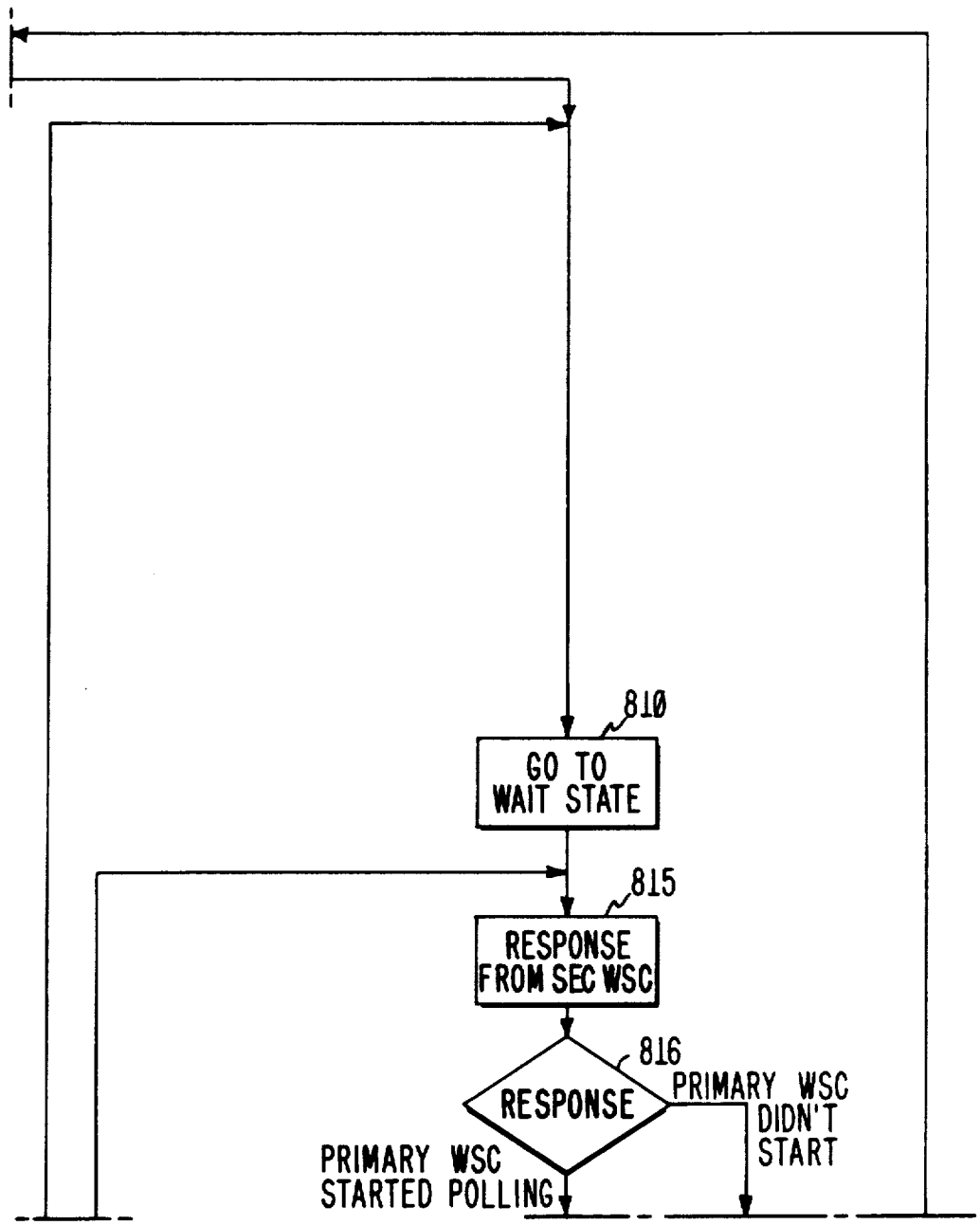
Figure 10D:
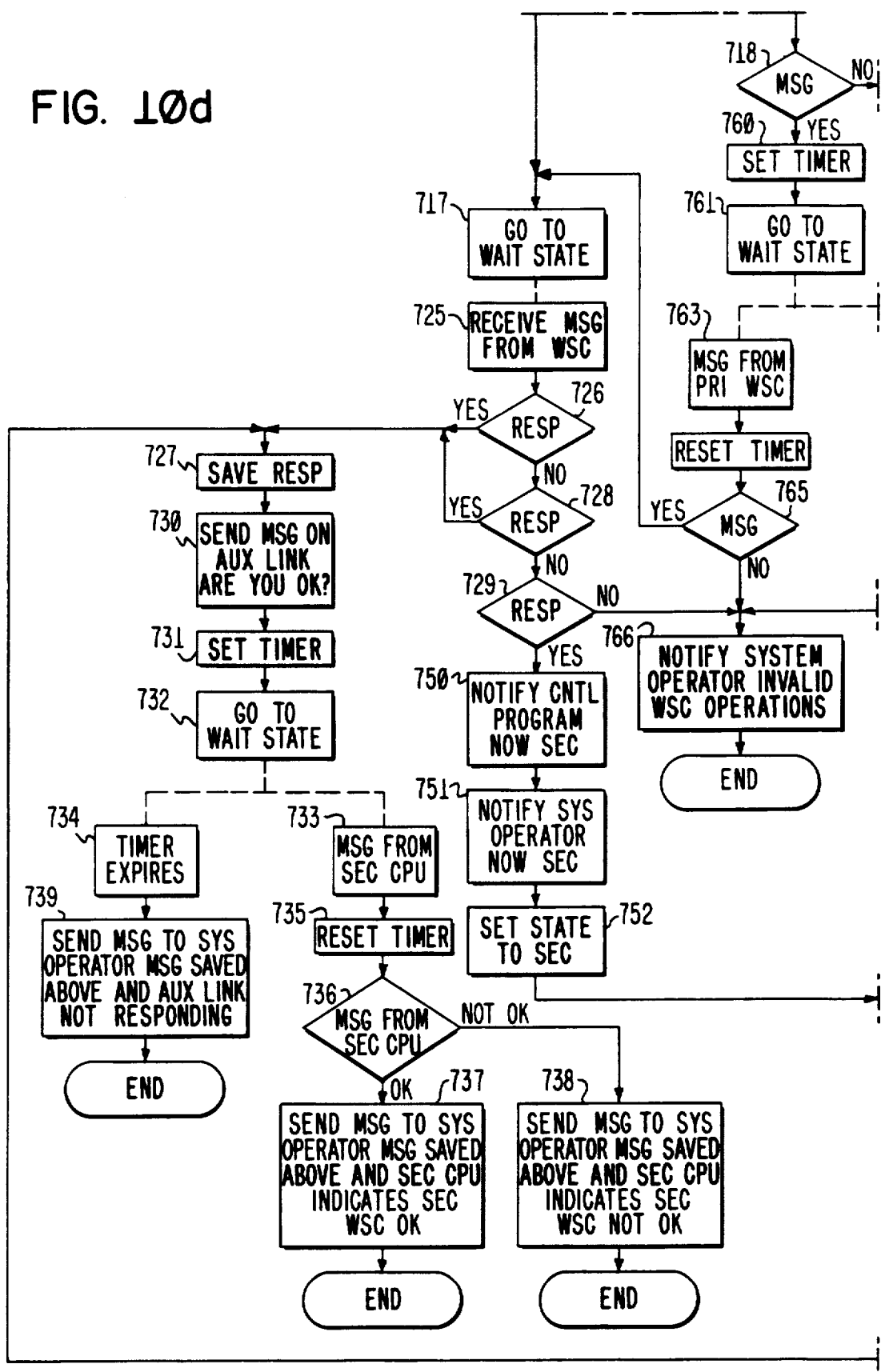

If the message detected by block 716, FIG. 10a, were to the effect that the secondary workstation controller 400 started responding to polls with the power on transition response, then the processor 20 went into a wait state, block 717, FIG. 10d, waiting to receive a message from the workstation controller 40 as indicated by block 725. Of course, as previously explained processor 20 does other work when the function it is performing goes to the wait state of block 717. Also as previously indicated the function comes out of the wait state when processor 20 receives from workstation controller 40 the address of workstation controller 400.

When the processor 20 goes out of the wait state for that function it looks for a message from workstation controller 40. Block 726 tests to see if the message is of the type where the secondary workstation controller 400 stopped responding to polls from the primary workstation controller 40. If it is, processor 20 saves the response as indicated by block 727. If it is not then block 728 tests to see if the message is of the type where the secondary workstation controller's response to polls is invalid after a predetermined number of retries. If that is the message then that response is saved as indicated by block 727. Otherwise block 729 tests to see if the message is one where the secondary controller 400 wants to be a primary workstation controller.

Assuming that the messages were either of the type tested for by blocks 726, 728 and 720 which was described above, then the messages are saved as indicated by block 727, and then processor 20 sends a message via the communications controller 60 and communications controller 600 to CPU 200 asking CPU 200 to determine if the secondary workstation controller 400 is functioning properly. This is indicated by block 730. CPU 20 then sets a programmable timer as indicated by block 731 and then goes to a wait state for this function. The CPU 20 comes out of the wait state for this function when either CPU 200 sends a message via the communications controllers 600 and 60 to CPU 20 or when the timer expires.

If CPU 200 sends a message to CPU 20 prior to expiration of the timer then CPU 20 resets the timer as indicated by block 735, and the type of message is then tested as indicated by block 736. If CPU 200 sends a message indicating that the workstation controller 400 is okay, then CPU 20 sends a message to the systems operator of CPU 20 to the effect that everything was okay, and thus the problem must be elsewhere. The systems operator for CPU 20 would then have to determine the problem, and the function being performed by CPU 20 for workstation controller 40 would terminate.

If CPU 200 sends a message to CPU 20 indicating that the workstation controller 400 is not okay then CPU 20 sends a message to the systems operator where the message consists of the saved response, i.e. the messages tested for by blocks 726, 728 or 720 and the message sent by CPU 200 via the communications controllers 600 and 60 that the secondary workstation 400 is okay. If block 736 determines that the message from CPU 200 was to the effect that the workstation controller 400 was not okay then CPU 20 sends a message to the systems operator where the message consists of the saved response and the message from the CPU 200 to the effect that the workstation controller 400 was not okay. In either case CPU 20 then terminates the function it has been performing.

If the timer had expired prior to CPU 200 sending a message to CPU 20 via the communications controllers 600 and 60, then CPU 20 sends a message to the systems operator which includes the saved response indicated by block 727 and a message to the effect that CPU 200 did not respond via communications controllers 600 and 60 to CPU 20 within the time limit set by the timer as indicated by block 739. This could be caused by either the CPU 200 not functioning or not functioning properly, or there is some fault with the auxiliary communications link which includes the communications controllers 600 and 60. In any event the processor 20 terminates the function that it had been performing after it sends the message to the systems operator.

If the message received by CPU 20 were of the type tested for by block 729 then CPU 20 would notify the control program operating in CPU 20 that workstation controller 40 will become a secondary workstation controller, and thus CPU 20 should switch states as indicated by block 750. CPU 20 then sends a message notifying the system operator that it is switching to the secondary state for this function. This is indicated by block 751. CPU 20 sets the function to the secondary state.

If the message received by CPU 20 from the workstation controller 40 were the type tested by block 718, FIG. 10a, i.e. that the secondary workstation controller 400 is not responding to polls, then CPU 20 sets a programmable timer as indicated by block 760, FIG. 10d, and goes to a wait state indicated by block 761. The function is taken out of the wait state when either the timer expires as indicated by block 762 or if CPU 20 receives the message from the workstation controller 40 before the time expires. If the timer expires as indicated by blocks 762 then CPU 20 sends a message via communications controllers 60 and 600 to CPU 200 asking that it determine if workstation controller 400 is okay as indicated by block 764, FIG. 10e. If CPU 20 receives a message from the workstation controller 40 prior to the timer expiring as indicated by block 763, FIG. 10d, then it tests for the type of message as indicated by block 765. IF the message is of the type indicating that the secondary workstation controller 400 has started responding polls and particularly with a response of power on transition, then CPU 20 switches to the operation indicated by block 717. Otherwise CPU 20 notifies the system operator with a message indicating that the workstation controller 40 is not operating properly as indicated by block 766, and the function ends.

Figure 10E:
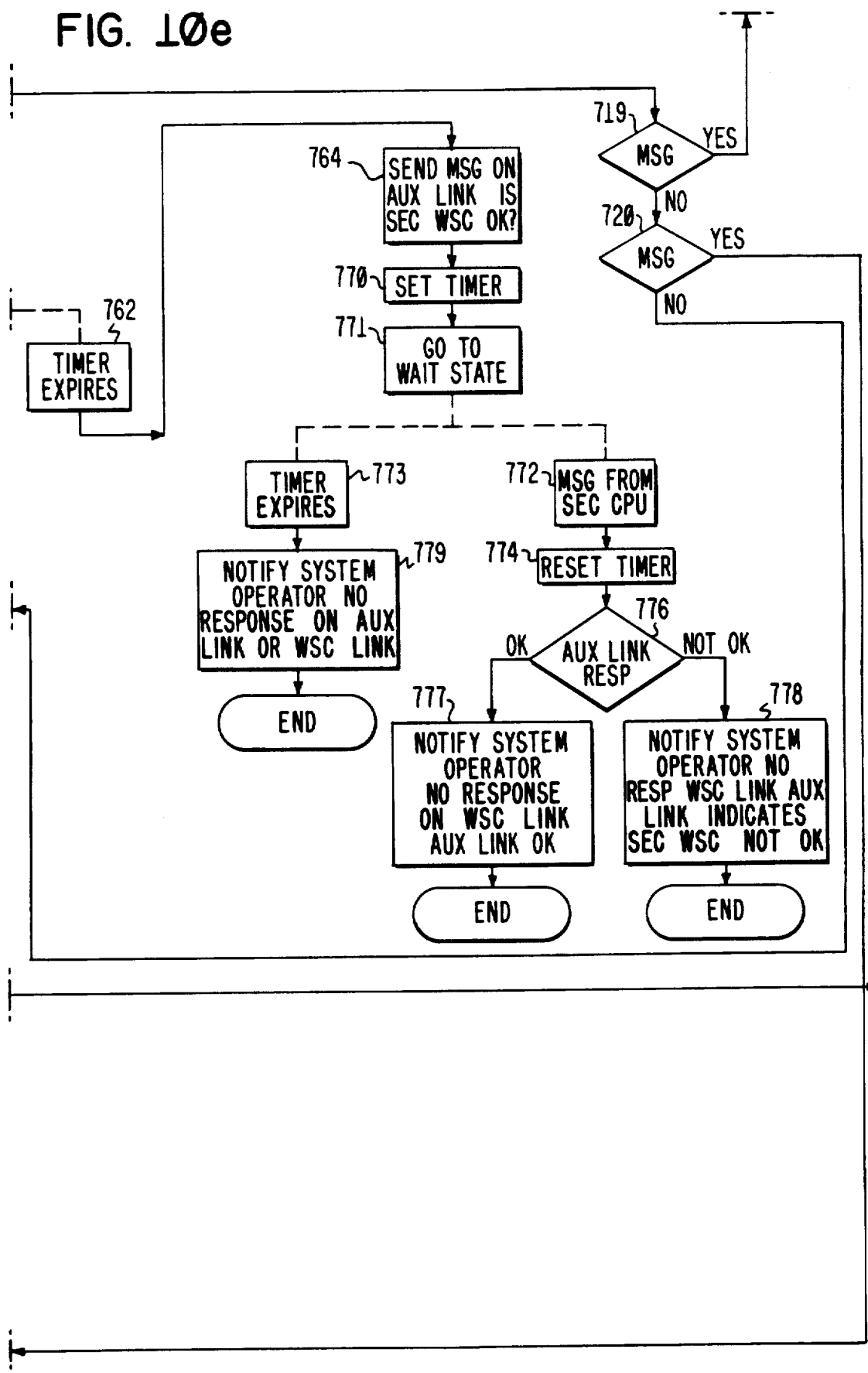

When the timer expires prior to a message from the primary workstation controller 40 and CPU 20 sends CPU 200 a message requesting CPU 200 to check the condition of workstation controller 400, then CPU 20 sets a timer as indicated by block 770, FIG. 10e, and goes to a wait state for this function as indicated by block 771. CPU 20 then comes out of this wait state for this function by either receiving a message from the secondary CPU 200 as indicated by block 772 or by the timer expiring as indicated by block 773. If a message is received from the secondary CPU 200 then CPU 20 resets the timer and makes a test for the type of message received from CPU 200 as indicated by block 776. If the message sent by CPU 200 indicates that the secondary workstation controller 400 is okay, then CPU 20 notifies the system operator that it did not receive a message from the workstation controller 40 but that the auxiliary communications link, i.e. the link via communications controllers 60 and 600 is okay as indicated by block 777, and the function then ends.

If the message sent by the secondary CPU 200 indicates that the secondary workstation controller 400 is not okay, then CPU 20 notifies the system operator that there was no response from the workstation controller 40 and that the auxiliary communications link was not okay as indicated by block 778, and then the function ends.

If the timer expires as indicated by block 773 then CPU 20 notifies the system operator that there was no message from the workstation controller 40 prior to the timer expiring and that the auxiliary communications link was not operable. This is indicated by block 779, and then the CPU 20 ends the function.

If the message detected by block 719, FIG. 10b, indicates that the secondary workstation controller 400 is keeping port 45 busy then CPU 20 sends a message to CPU 200 via the communications controllers 60 and 600 requesting CPU 200 to stop the secondary workstation controller 400 as indicated by block 780. CPU 20 then sets a programmable timer as indicated by block 781 and goes to a wait state block 782. CPU 20 is taken out of the wait state for this function by either receiving a message from the secondary CPU 200, block 783, or the timer expires, block 784. If CPU 20 receives a message from secondary CPU 200 then the timer is reset, block 785, and a test is made by block 786 for the type of response from CPU 200. If the message sent by CPU 200 indicates that the secondary workstation controller 400 is okay, CPU 20 sends a message to the systems operator which indicates that the secondary workstation controller 400 continues to send and that the auxiliary communications link is okay. If the message sent by CPU 200 indicates that the secondary workstation controller is not okay, then CPU 20 sends a message to the systems operator which indicates that the secondary workstation controller 400 continues to send and that the secondary computer 200 has sent a message via the auxiliary communications link that the secondary workstation controller is not okay, block 788. CPU 20 then terminates the function.

If the timer expires, block 784, prior to CPU 200 sending a message, then CPU 20 sends a message to the system operator indicating that the secondary workstation controller 400 continues to send and the secondary CPU 200 does not respond on the auxiliary communications link, block 789. CPU 20 then terminates the function.

As previously mentioned the wait state indicated by block 810, FIG. 10c, of the secondary state is entered from either block 712, FIG. 10a, or from block 752, FIG. 10d. It is entered from block 712 when CPU 200 is initially set as the secondary host CPU, and it is entered from block 752 when the secondary workstation controller 400 is being switched to function as the primary workstation controller. The CPU operating in the secondary state, i.e. secondary host CPU 200, is taken out of the wait state for this function when there is a response from the secondary workstation controller 400 as indicated by block 815. Block 816 checks the type of response from the secondary workstation controller 400. If the response is one indicating that the primary workstation controller 40 has started polling, then the secondary host computer 200 goes to a wait state for this function. If the response indicates that the primary workstation controller 40 did not start polling then secondary host CPU 200 sends a message via the communication controllers 600 and 60 to the primary host CPU 20 as indicated by block 825.

When the secondary host CPU 200 goes to the wait state indicated by block 817 it normally remains in this wait state for this function but comes out of the wait state when there is a message from the secondary workstation controller 400. There is only one valid message under this condition from the secondary workstation controller 400. That valid message is an indication that the primary workstation controller 40 has stopped polling. Block 821 checks for the type of message from the secondary workstation controller 400. If the message is valid, i.e. it indicates that the primary workstation controller 40 has stopped polling, then the secondary host CPU 200 sends a message to the primary host CPU 20 via the communications controllers 600 and 60 as indicated by block 825. If there is a message from the secondary workstation controller 400 other than one that indicates that the primary workstation controller 40 has stopped polling, then CPU 200 notifies the system operator that the secondary workstation controller 400 is not operable, and the operation ends for this function.

After CPU 200 has sent the message to CPU 20 indicating that the primary workstation controller 40 has stopped polling, CPU 200 sets a programmable timer and goes to a wait state as indicated by blocks 826 and 827 respectively.

Figure 10F:
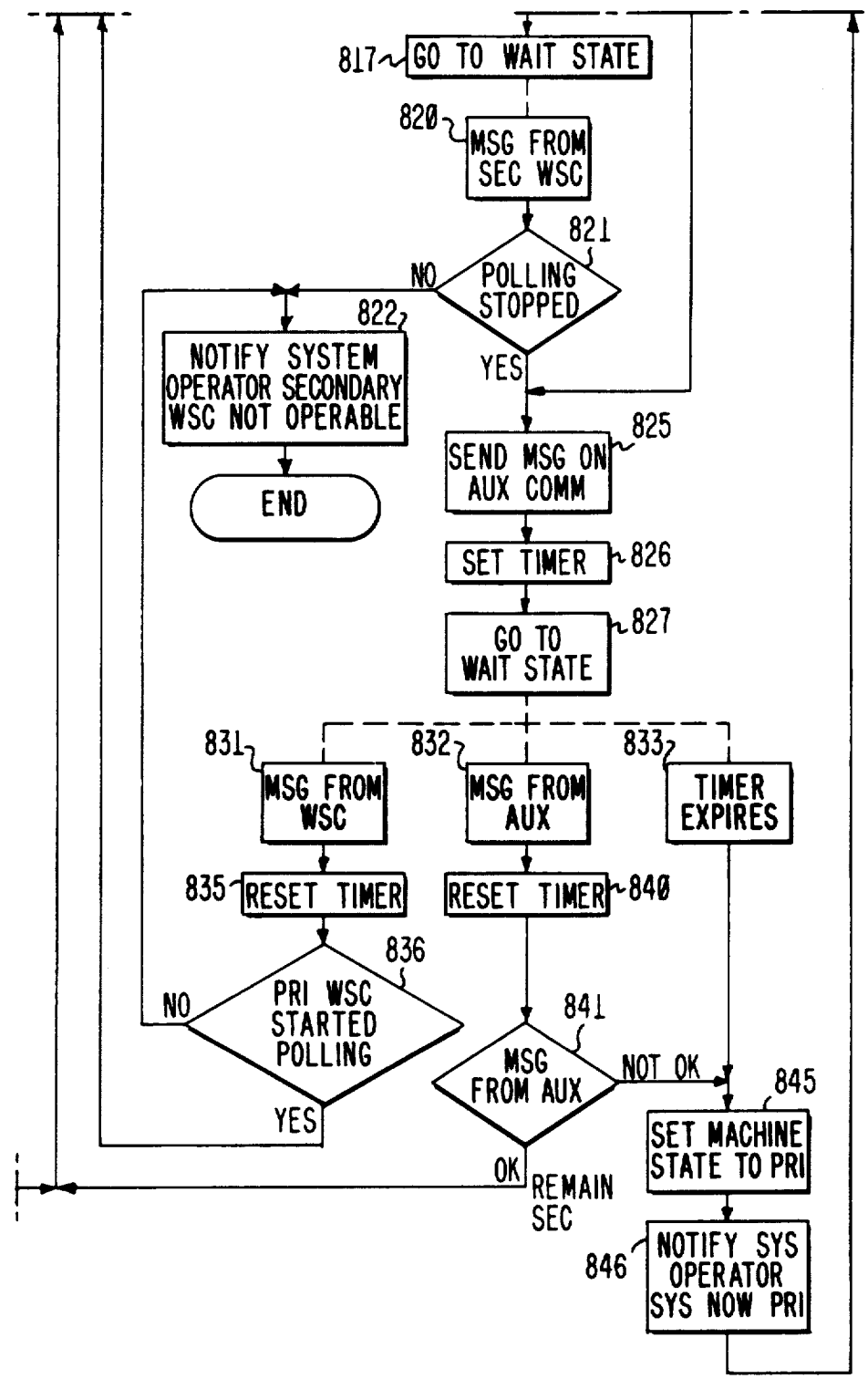

CPU 200 comes out of the wait state for this function if there is a message from the secondary workstation controller 400, block 831, FIG. 10f, a message received from CPU 20 via communications controllers 60 and 600, block 832, or if the timer set by CPU 200 expires, block 833. If there is a message from the workstation controller 400 prior to the timer expiring, then the timer is reset, block 835, and a test is made to determine the type of message from the secondary workstation controller 400. If the message is one indicating that the primary workstation controller 40 has started polling, then the operation switches back to block 815. Otherwise the system operator is notified by CPU 200 that the secondary workstation controller 400 is not operable as indicated by block 822, FIG. 10c, and the function ends. If CPU 200 receives a message from CPU 20 then it resets the timer block 840, FIG. 10f, and the type of message is determined, block 841, by CPU 200. If the message received from CPU 20 indicates that the primary workstation controller 40 is okay, then the operation switches back to block 810, FIG. 10c, i.e. CPU 200 goes into a wait state for this function. If the message is one indicating that the primary workstation controller 40 is not okay, then CPU 200 sets itself for this function to the primary state, block 845, and notifies the system operator that CPU 200 is now operating as the primary host CPU for this function as indicated by block 846.

If the timer expires as indicated by block 833 prior to a message from either the secondary workstation controller 400 or a message from CPU 20 via the communication controllers 60 and 600, then CPU 200 sets itself to the primary state for this function as indicated by block 845, and the system operator as previously indicated is notified that CPU 200 is now operating as the primary host for this function, block 846.

Figure 2A:
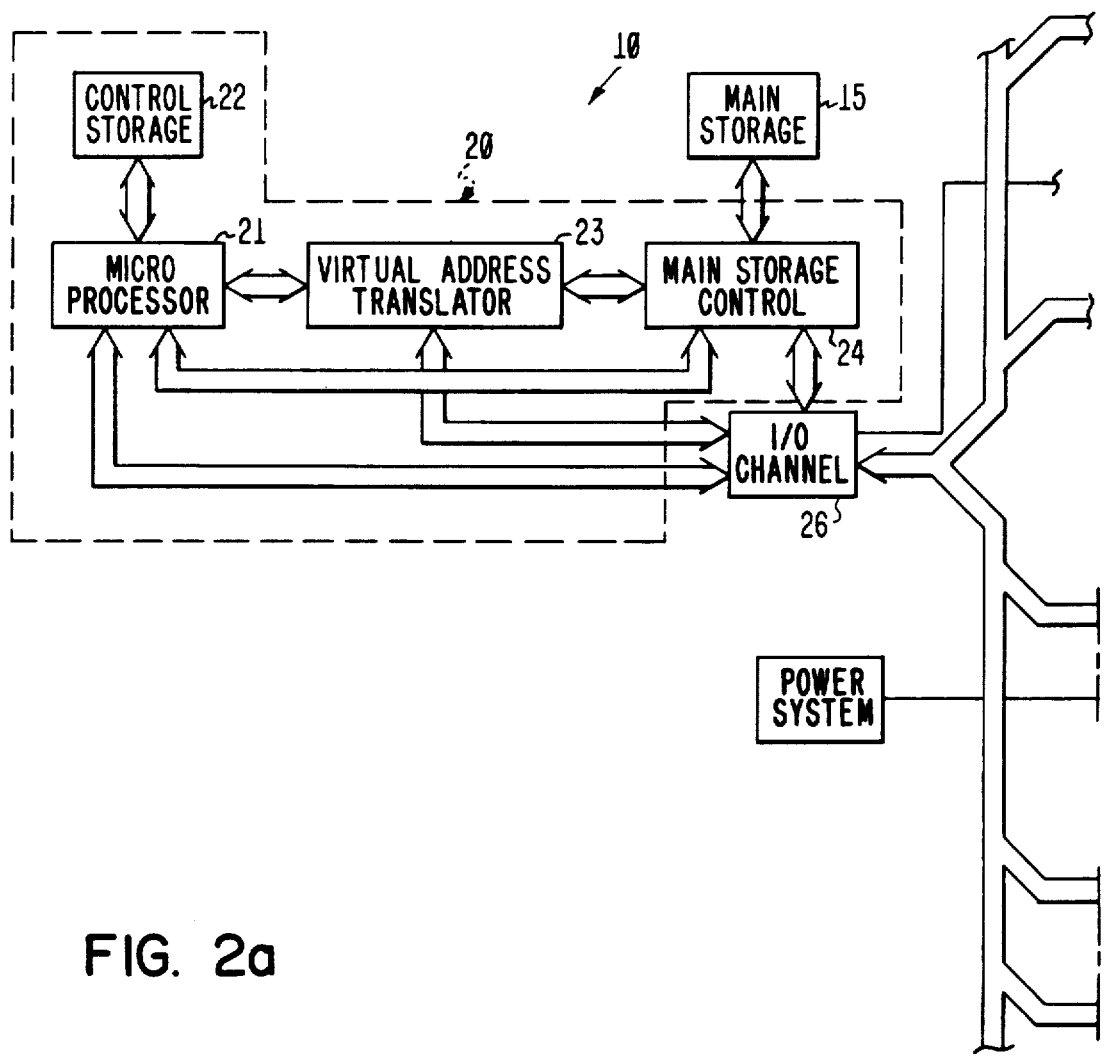
FIGS. 2a, 2b, 2c and 2d taken together as in FIG. 2, are a more detailed block diagram of the computer system of FIG. 1.
Figure 2:
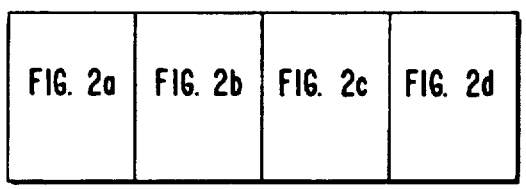
FIG. 2 is a diagram illustrating the arrangement of FIGS. 2a, 2b, 2c and 2d.

The computer systems 10 and 100 of FIG. 1 are shown in greater detail in FIGS. 2a, 2b, 2c and 2d. In FIG. 2a CPU 20 can be of the type shown and described in U.S. Pat. No. 4,258,417 dated Mar. 24, 1981 by Berglund et al for, "System For Interfacing Between Main Store Memory and a Central Processor," which includes a microprocessor 21 for processing control words received from control storage 22. Microprocessor 21 also can access main storage 15 via virtual address translator 23 and main storage control 24. CPU 20 interfaces with an I/O channel 26 which can be of the type shown and described in U.S. Pat. No. 4,381,540 dated Apr. 26, 1983 entitled, "Asynchronous Channel Error Mechanism" by Lewis et al.

Figure 2B:
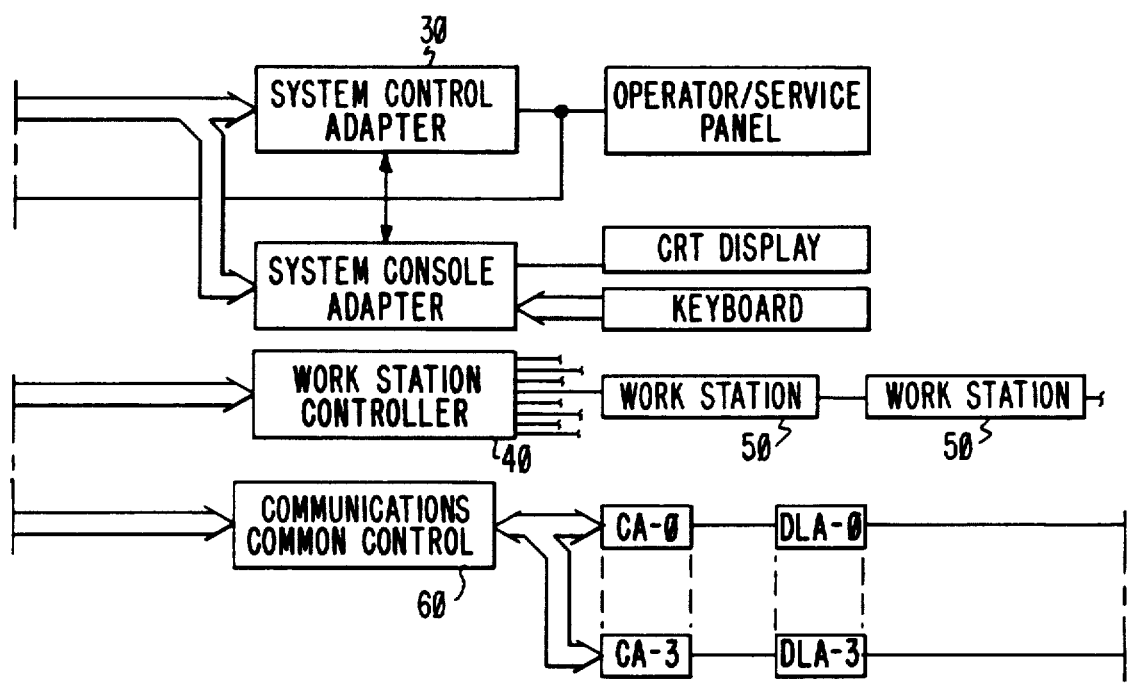
Figure 2C:
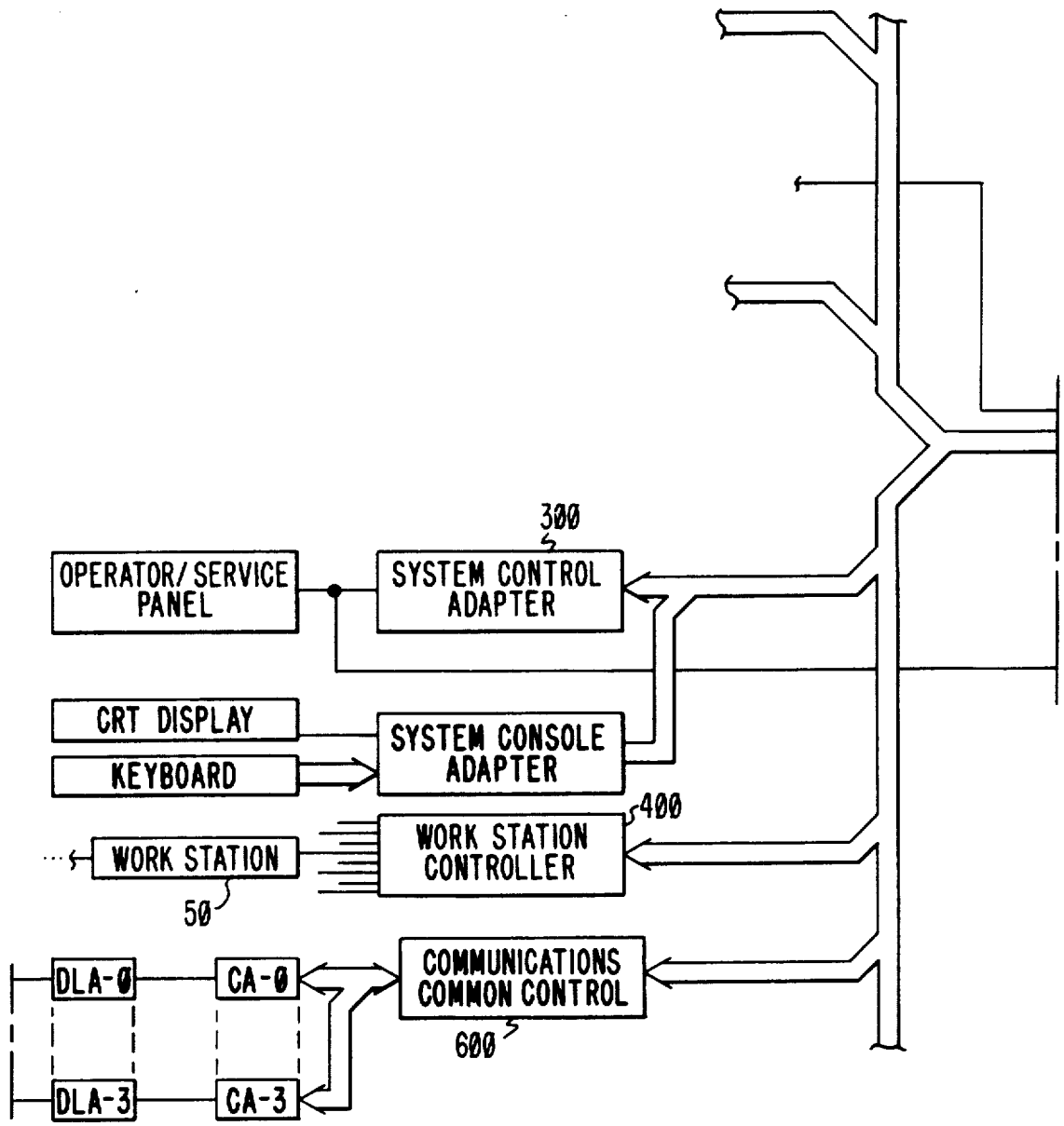

The channel 26 interfaces with workstation controller 40 and communications controller 60 as shown in FIG. 2b. I/O channel 26 also interfaces with a system control adapter 30 which is of the type shown and described in U.S. Pat. No. 4,023,142 dated May 10, 1977 entitled, "Common Diagnostic Bus for Computer Systems to Enable Testing Concurrently with Normal System Operation" by R. J. Woessner.

Figure 2D:
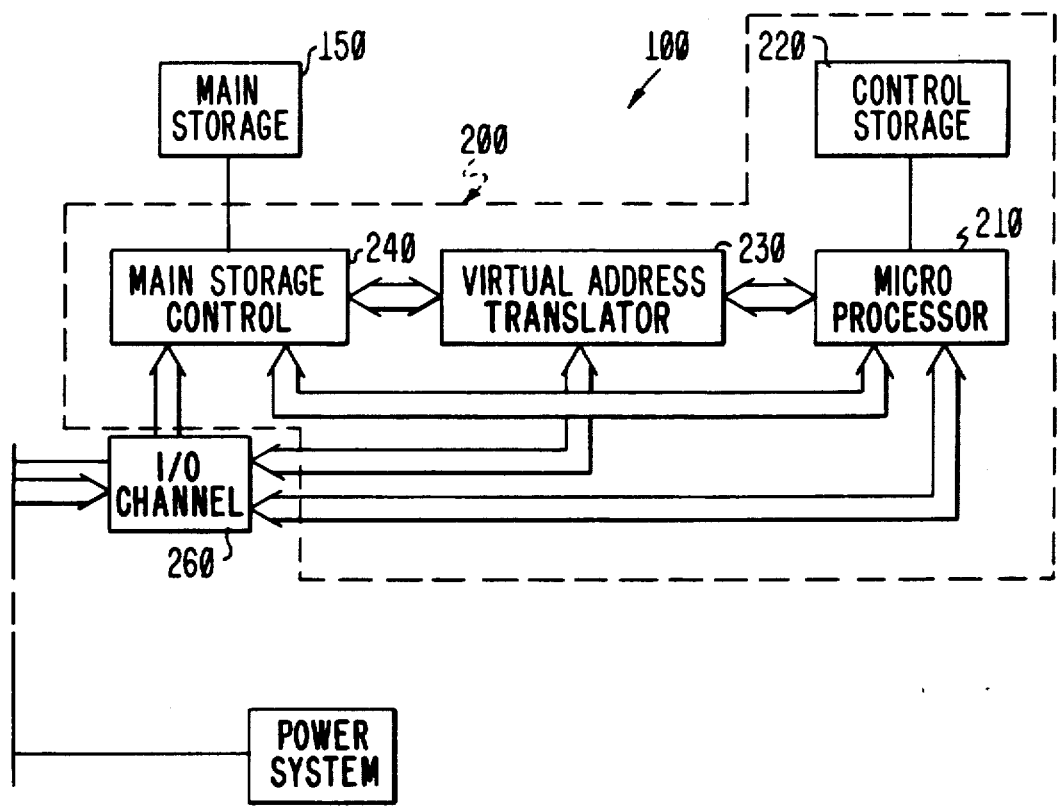

The CPU 200 of the secondary computer system 100 is shown in FIG. 2d and in this example it is identical to the primary, i.e. it has a microprocessor 210, a control storage 220, a virtual address translator 230 and a main storage control 240. The secondary CPU 200 interfaces with a channel 260 which in turn interfaces with the workstation controller 400 and the communications controller 600, FIG. 2c. The channel 260 also interfaces with system control adapter 300.

Figure 3A:
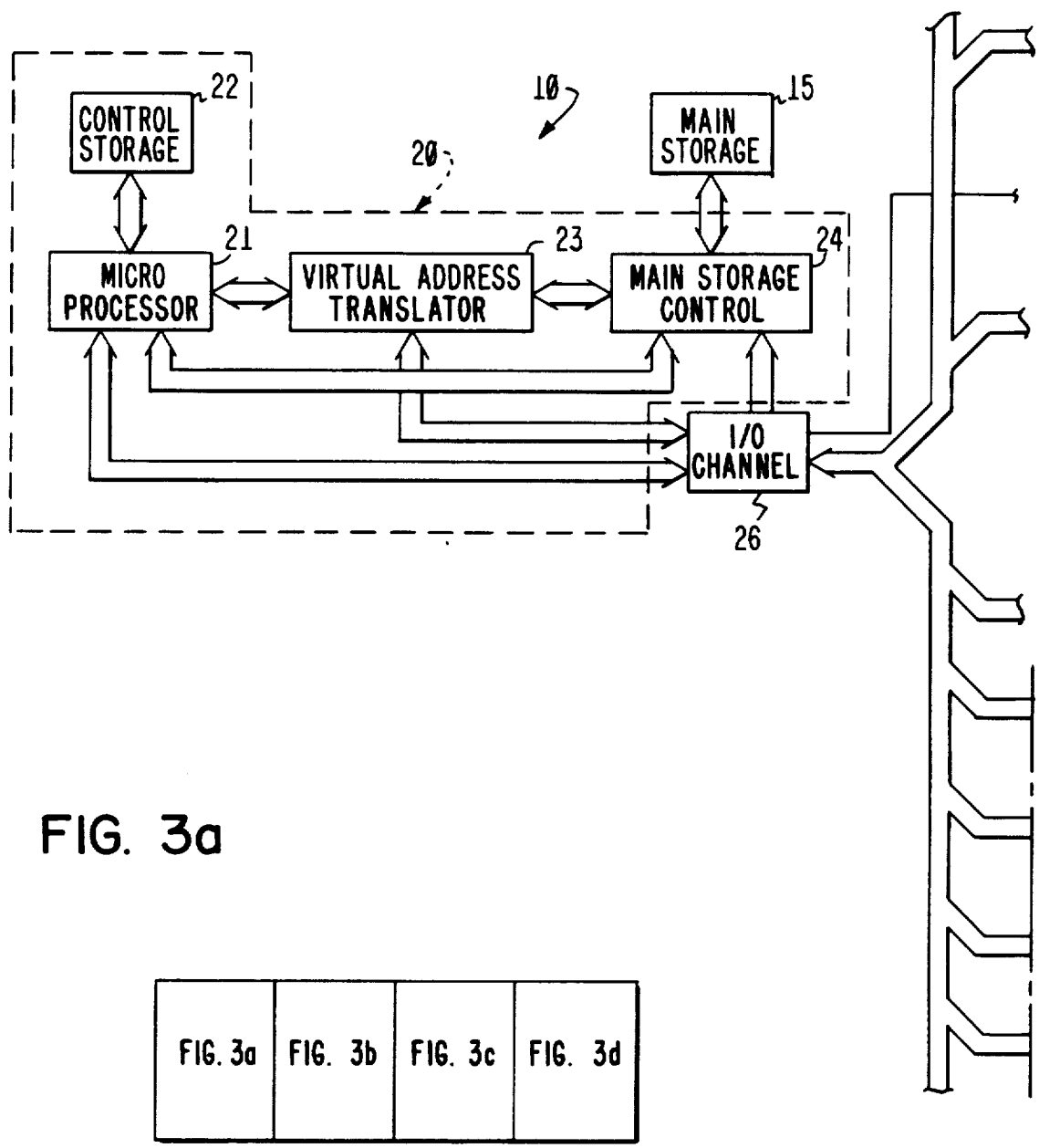
FIGS. 3a, 3b, 3c and 3d, taken together as in FIG. 3, are a schematic block diagram of a computer system where each computer of the system functions as both a primary and secondary host and has both primary and secondary workstation controllers connected to it as well as independent workstation controllers.
Figure 3:
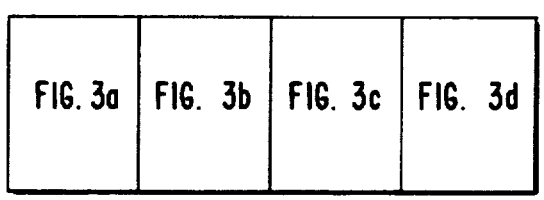
FIG. 3 is a schematic diagram illustrating the arrangements of FIGS. 3a, 3b, 3c and 3d.
Figure 3B:
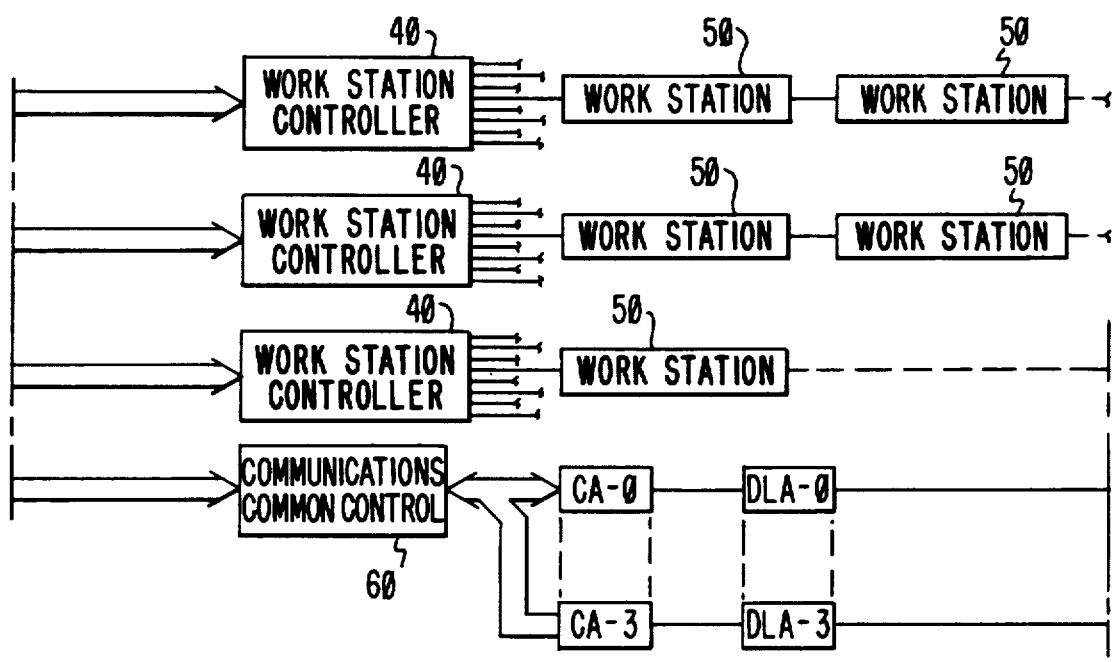
Figure 3C:
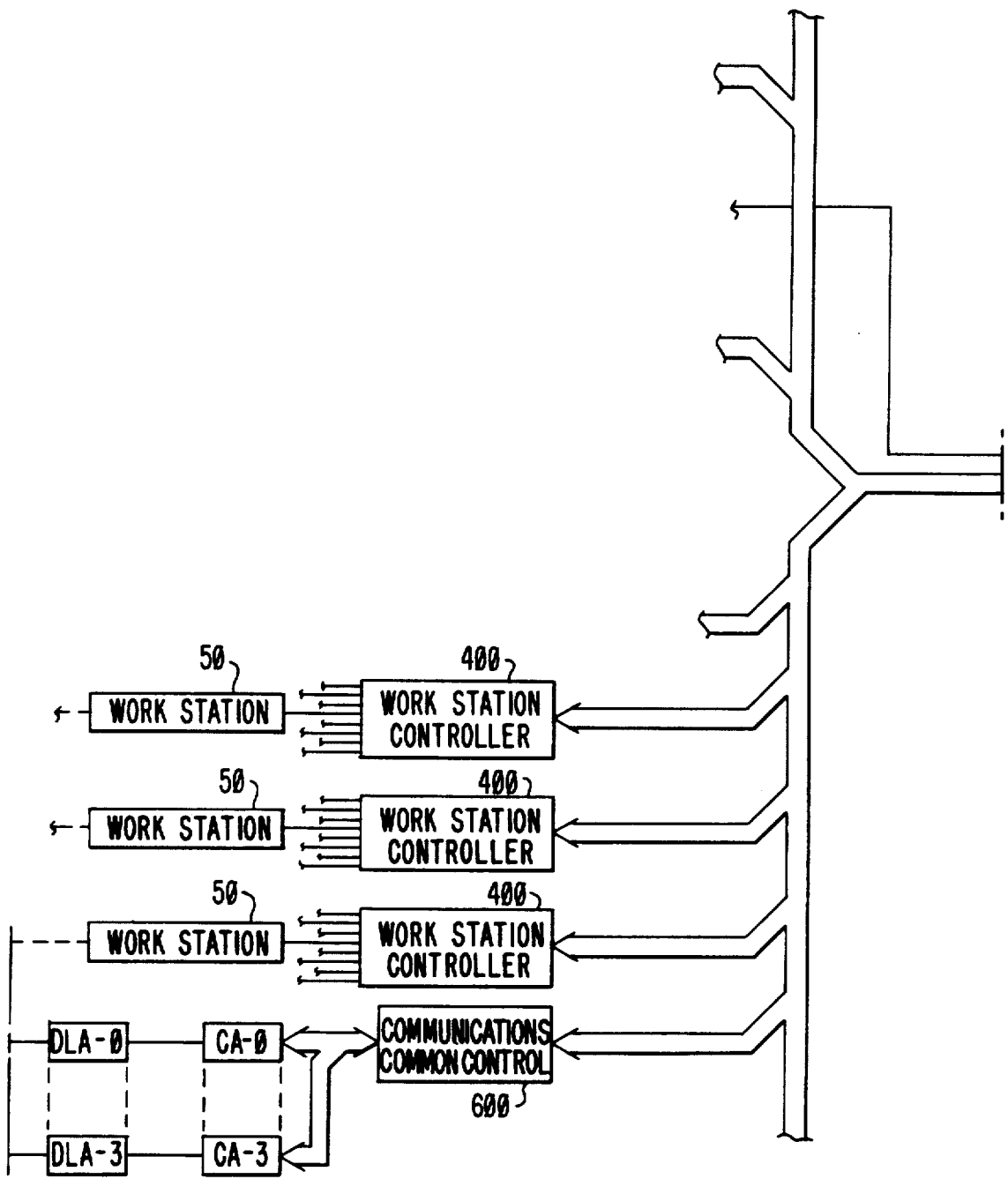
Figure 3D:
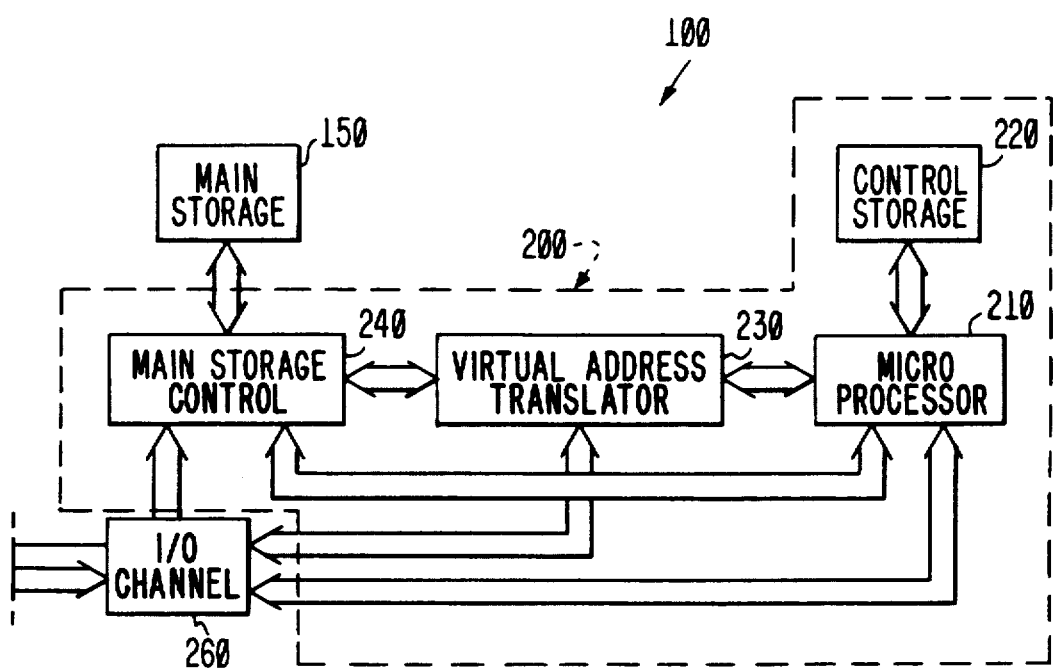

In FIGS. 3a, 3b, 3c and 3d the primary host CPU 20 is shown in detail as in FIG. 2a but in FIGS. 3a and 3b it is shown as functioning as a host to several workstation controllers 40 where one of the workstation controllers 40 is functioning as a primary workstation controller, and the other workstation controllers 40 are independent workstation controllers, not functioning as either primary or secondary workstation controllers. Similarly in FIG. 3d the secondary host CPU 200 is shown in detail as in FIG. 2d, and it is connected to a plurality of workstation controllers 400 where one of the workstation controllers 400 is a secondary workstation controller, and the other workstation controllers 400, FIG. 3c, are functioning as independent workstation controllers.

Figure 4:
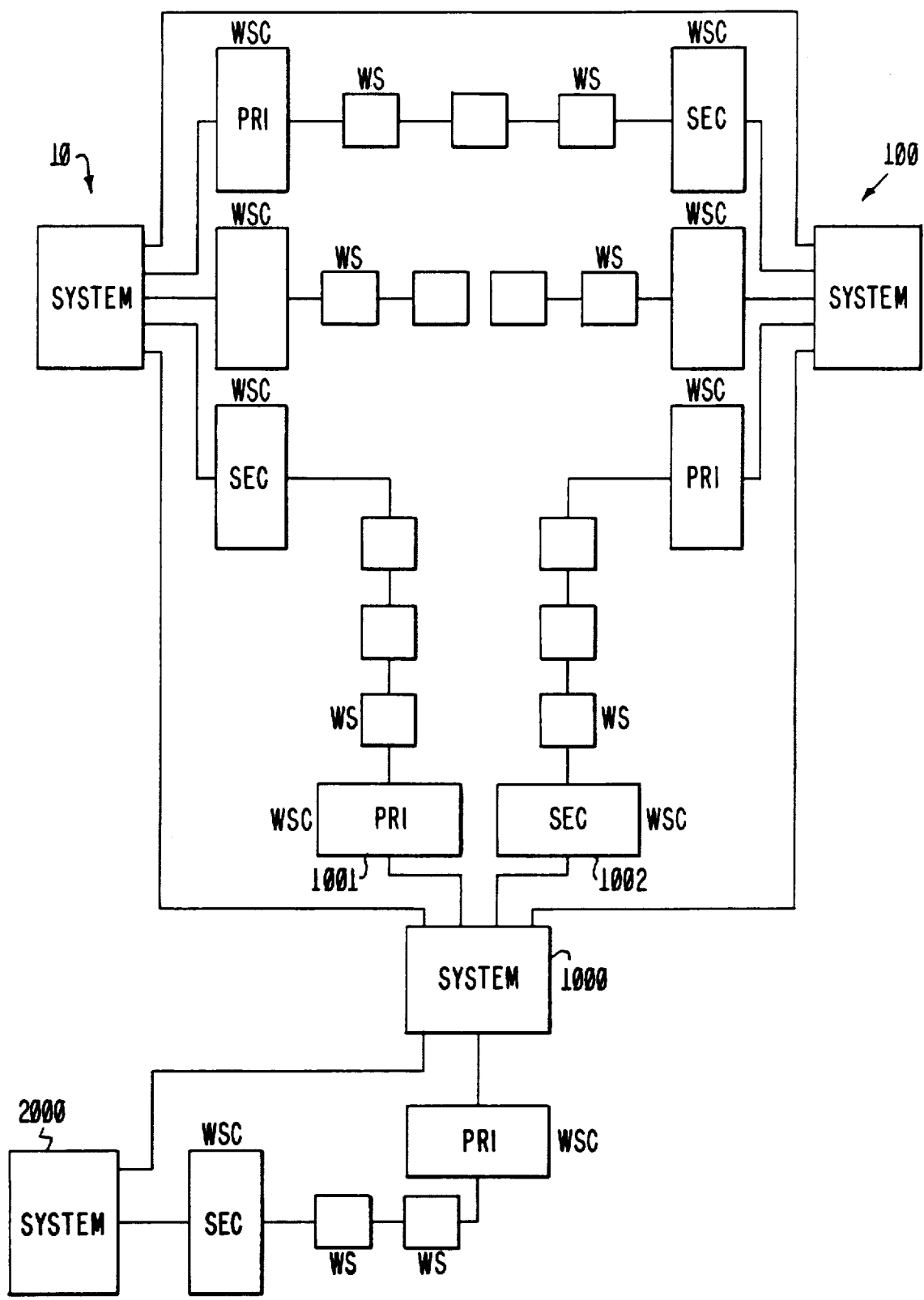
FIG. 4 is a schematic block diagram showing the invention incorporated in a computer system including four computers where one of the computers functions as a primary host to more than one secondary computer.

In FIG. 4 the computer systems 10 and 100 function as shown in FIG. 1 but also computer system 10 functions as a secondary host system, and computer system 100 functions as a primary host system with respect to computer system 1,000 which controls both primary workstation controller 1,001 and secondary workstation controller 1,002. Computer system 1,000 also functions as a primary host computer system with respect to secondary host computer system 2,000.

Figure 5:
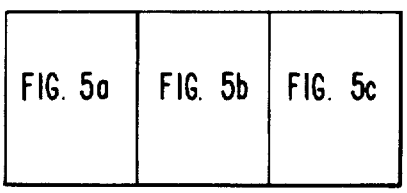
FIG. 5 shows the arrangement of FIGS. 5a, 5b and 5c.
Figure 5A:
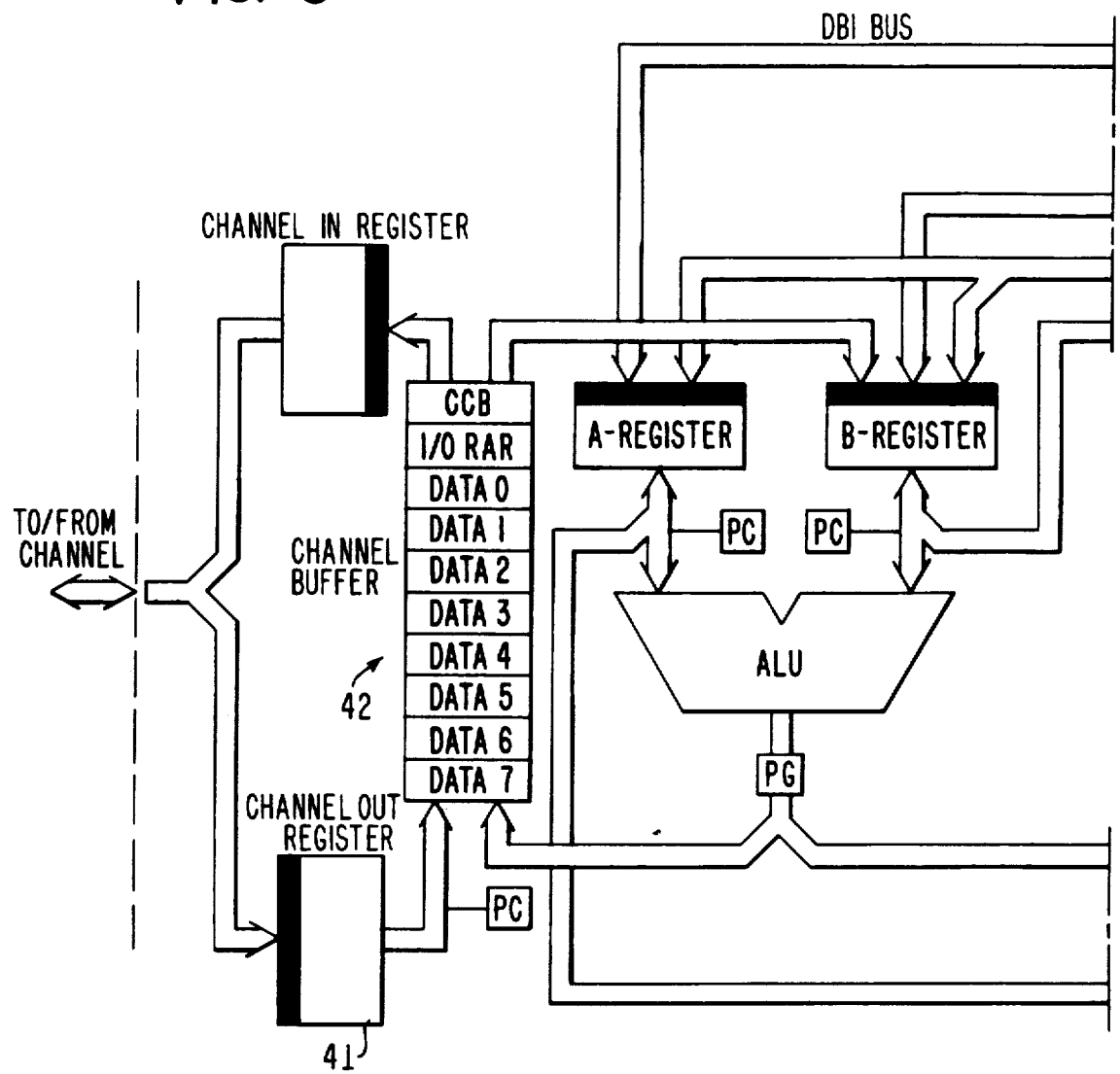
FIGS. 5a, 5b and 5c, taken together as in FIG. 5, are a schematic block diagram illustrating the data flow of a workstation controller.
Figure 5B:
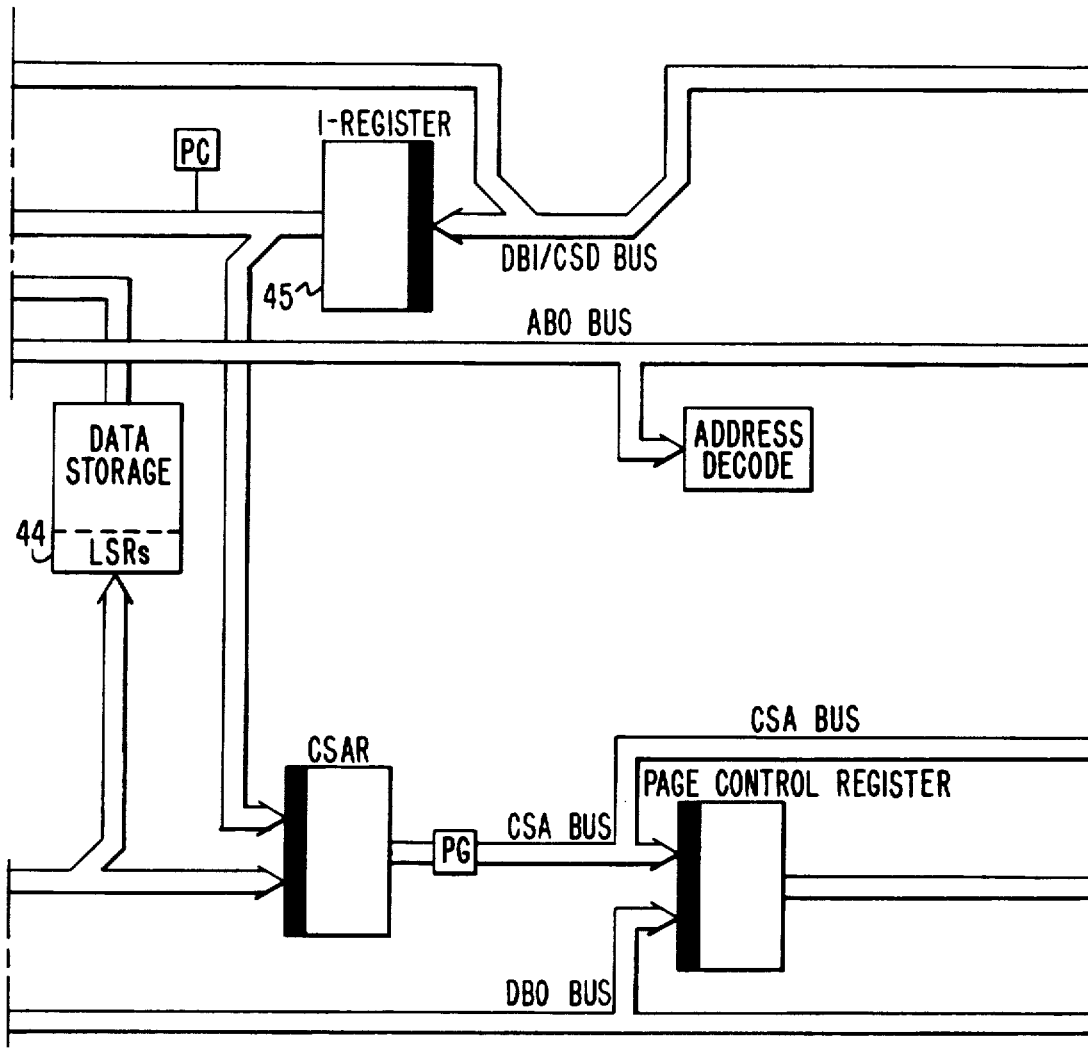
Figure 5C:
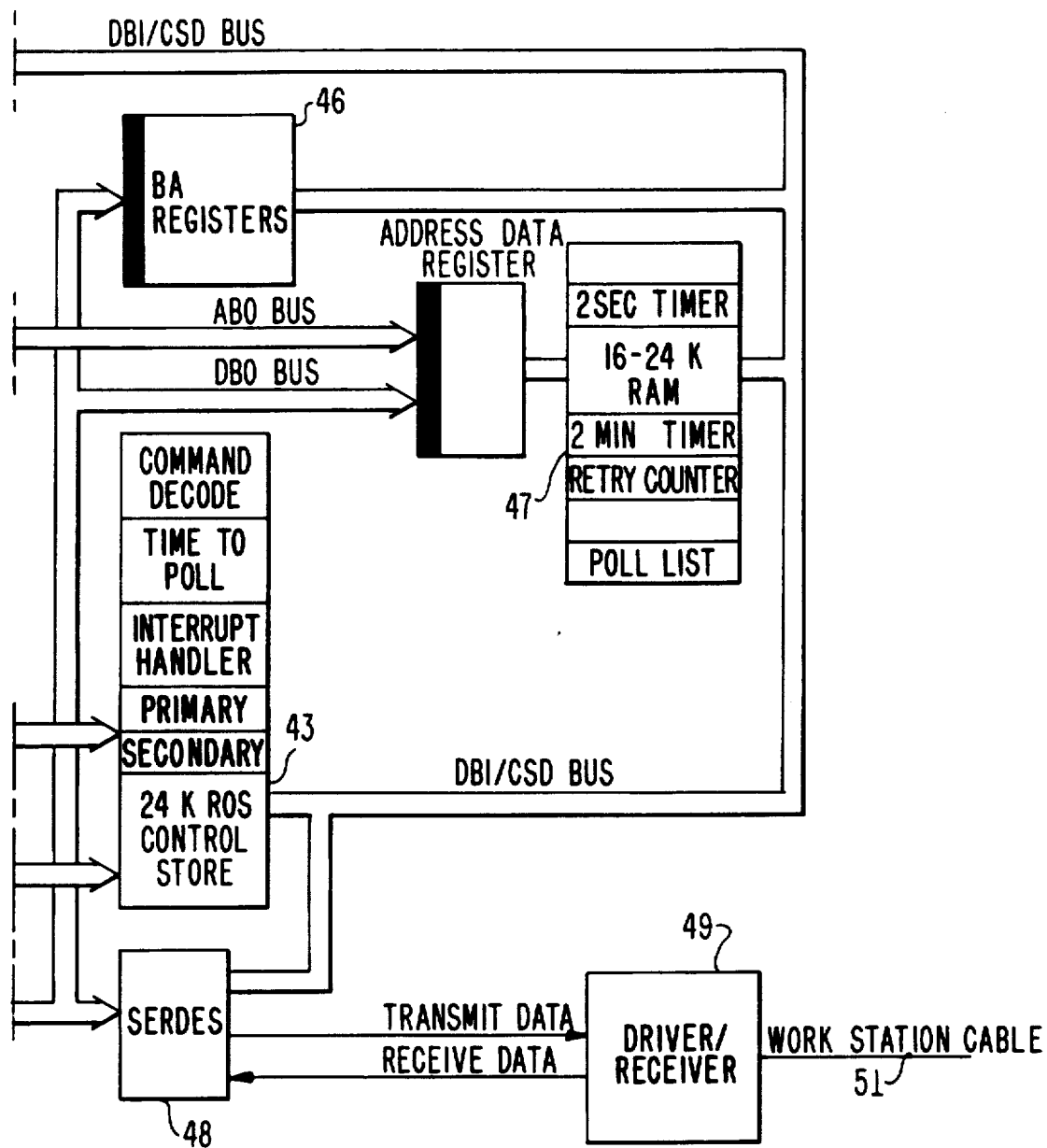

The workstation controllers 40 and 400 as previously mentioned can be identical and are shown in detail in FIGS. 5a, 5b and 5c. Data from the host CPU via the channel is entered into the channel out register 41 of the workstation controller and is transferred therefrom to the channel buffer 42. This date could be I/O device commands, for example. Microcode in control store 43, FIG. 5c, moves the command from the channel buffer 42 to data storage 44, FIG. 5b. The microinstructions then decode the command. These microinstructions are moved from control storage 43 into the register 45 for execution.

After the command is decoded control information and data from the command is passed from data storage 44, FIG. 5b, to the registers 46, FIG. 5c. The two second and two minute timers as well as the retry counter and poll list are contained in random access storage 47.

Figure 6A:
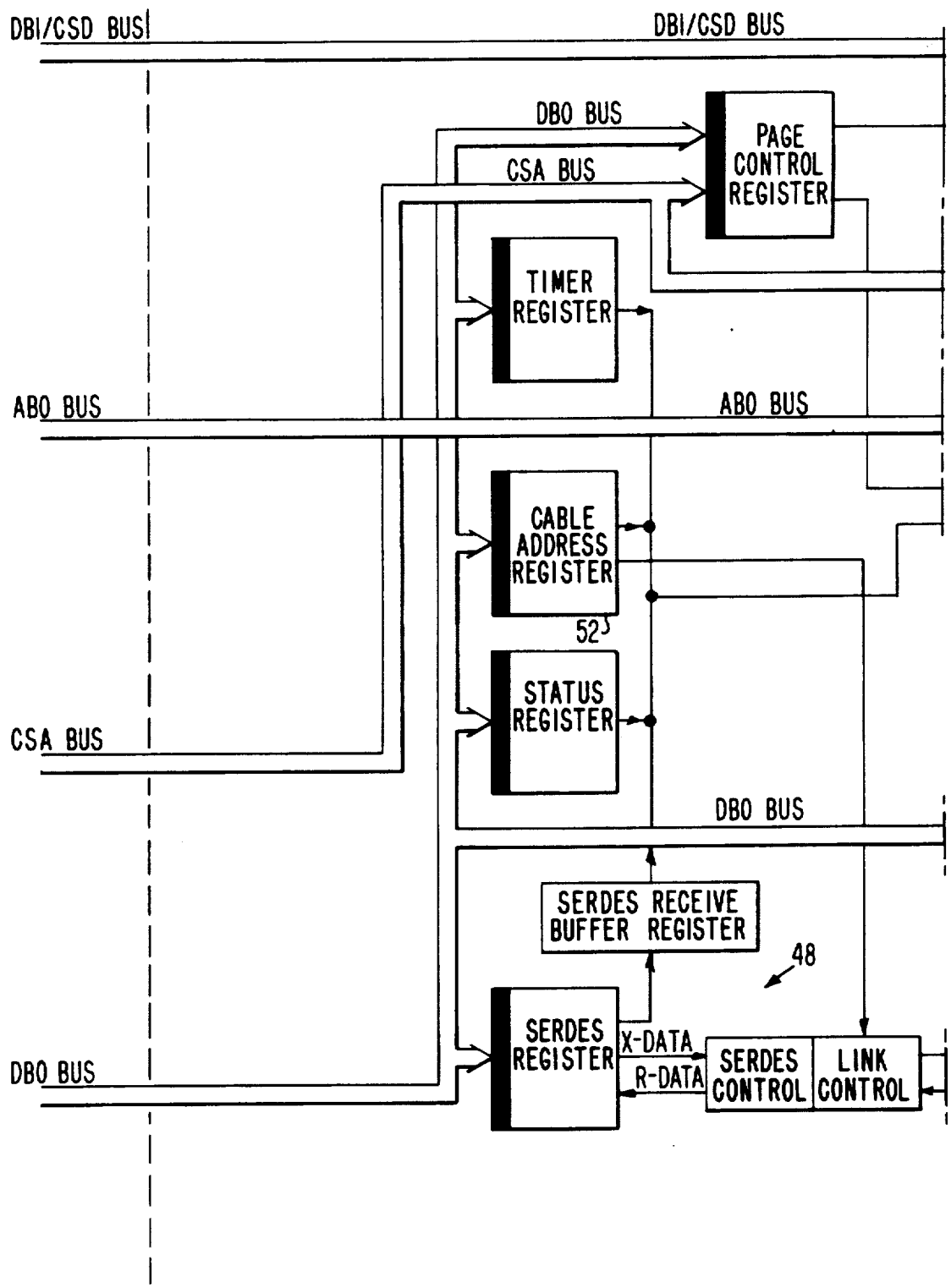
FIGS. 6a and 6b, with FIG. 6a disposed to the left of 6b, taken together, are a schematic block diagram showing a portion of the workstation controller in greater detail.
Figure 6B:
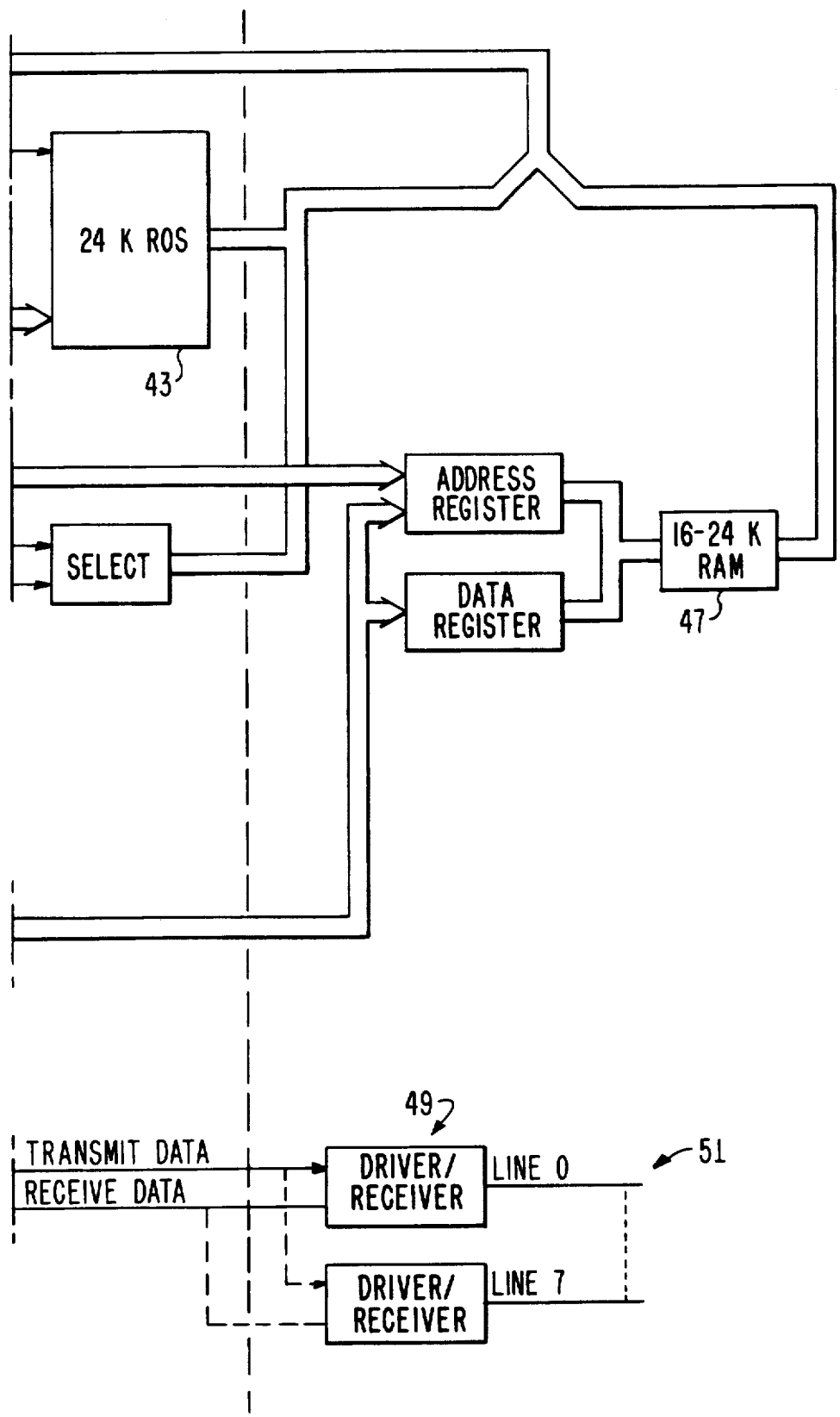

The workstations 50 attach to the workstation controller via a workstation cable 51 which is attached to the driver/receiver 49 of the workstation controller, FIG. 5c. The driver/receiver attaches to a serializer/-deserializer (serdes) 48 of the workstation controller, FIG. 5c. The serdes 48 is shown in greater detail in FIG. 6a. It functions in a conventional manner of a serializer and deserializer of data. The cable =15 address register 52, FIG. 6a, contains information for specifying the line and workstation address of the workstations connected to the lines forming the cable 51. Each line connected to a driver/receiver card 49 of FIG. 6b is addressable as well as the workstations connected to the line, and in this example a maximum of seven workstations can be connected to each line.

Figure 7:
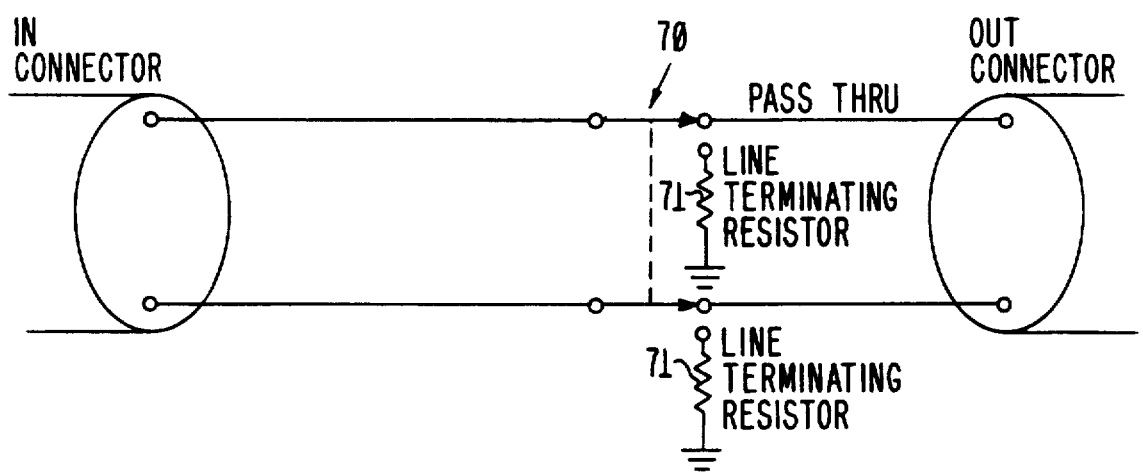
FIG. 7 is a schematic diagram of a line pass-through connection.

The workstations 50 adjacent to the workstation controllers 40 and 400 are connected with the outconnector connected to the workstation controllers whereby on removal of an inoperable workstation controller the line will be properly terminated. The in and out connectors are shown in FIG. 7. Switch 70 when in the position shown is in the cable through position and can be operated to connect with line terminating resistor 71.

From the foregoing it is seen that the present invention has a minimal number of single elements in the data path that are subject to failure. One of the workstation controllers, i.e. the standby workstation controller, appears as a workstation to the operating workstation controller. When there is a problem with the host system for the operating workstation controller or if there is a problem with the operating workstation controller itself, then the standby workstation controller takes over and controls the workstations so as to provide continuous operation. The secondary or standby host processor using a communications path determines when the primary host processor is not operating properly for the primary workstation controller. The secondary host processor then through the secondary workstation controller communicates this back to the primary or operating workstation controller requesting that it switch to the secondary or standby state, and the standby workstation controller takes over as the operating workstation controller.

We claim:

1. A computer system comprising:
   a primary host computer, a secondary host computer, a primary workstation controller, a secondary workstation controller, a plurality of workstations where said primary and secondary workstation controllers are coupled to said primary and secondary host computers respectively;
   connecting means for connecting said primary and secondary workstation controllers to said plurality of workstations to enable said primary and secondary work station controllers to poll said plurality of workstations and each other,
   control means in each of said primary and secondary workstation controllers coupled to the connecting means for operating the primary and secondary workstation controllers in a standby mode and in a control mode in response to commands from said primary and secondary host computers, where operation in the standby mode includes responding to polls in the same manner as the workstations and generating a mode switch request message upon failure of being polled within a predetermined period of time and where operation in the control mode includes said control means polling said plurality of workstations and the workstation controller in the standby mode, and switching to the standby mode upon receiving a mode switch request message; and
   an auxiliary communication link connected between said primary and secondary host computer enabling each to communicate thereon to determine if the other is operational to control the connected workstation controllers, said auxiliary communication link is used by the primary and secondary computers to determine which one will command the connected workstation controller to be in the control mode and which one will command the connected workstation controller to be in the standby mode.

2. The computer system of claim 1 where the host computer commanding the connected workstation controller to be in the standby mode is responsive to a mode switch message from said workstation controller in the standby mode to command that workstation controller to switch from the standby to the control mode.

3. The computer system of claim 1 where the host computer, which commanded its connected workstation controller to be in the standby mode upon determining via the auxiliary communication link that the other host computer is non operational to control its connected workstation controller, commands the workstation controller in the standby mode to switch to the control mode.

4. The computer system of claim 3 where the workstation controller upon switching into the control mode from the standby mode sends a mode switch message to the other workstation controller which upon receiving the mode switch message switches to the standby mode.

5. A computer system comprising:
   a first host computer coupled to a first workstation controller;
   said first workstation controller connected to a plurality of workstations by a single connecting means, said connecting means connects said plurality of workstations and said first workstation controller to a second workstation controller;
   said second workstation controller coupled to a second host computer;
   said first and second workstation controllers having control means for operating said first and second workstation controllers in a standby mode and a control mode in response to commands from said first and secondary host computers;
   operation of said first and second workstation controllers in said standby mode includes responding to polls over said connecting means in the same manner as workstations, responding to polls over said connecting means with a power on transition signal, responding to polls over said connecting means with a mode switch request message and generating a mode switch request message upon failure of being polled within a predetermined period of time;
   operation of said first and second workstation controllers in said control mode includes polling said workstations and workstation controllers in said standby mode and switching to said standby mode upon receipt of a mode switch request message; and
   an auxiliary communications link connected between said first and second host computers, said first and second host computers monitor each other over said auxiliary communication link and said connecting means.

6. A computer system, as in claim 5, wherein:

said first and second host computer execute identical poll lists when operation of said first and second host computers initiates;

said poll lists designate a primary host computer and a secondary host computer from said first and second host computers, said workstation controller coupled to said designated primary host computer becomes a primary workstation controller, said workstation controller coupled to said secondary host computer becomes a secondary workstation controller;

said primary workstation controller polls said secondary workstation controller;

said secondary workstation controller responds to a first poll of said primary workstation controller by sending a power on transmission signal over said connecting means to said primary workstation controller and by sending a report of said first polling signal to said secondary host computer coupled to said secondary workstation controller; and said secondary workstation controller responds over said connecting means in the same manner as the workstations to a plurality of polls after said first poll.

7. A computer system, as in claim 6, wherein:

said secondary workstation controller responds to a failure of said primary workstation controller to poll said secondary workstation controller by sending a mode switch request message to said secondary host computer to said secondary workstation controller; and said secondary host computer relays said mode switch request message to aid primary host computer over said auxiliary communications link.

8. A computer system, as in claim 7, wherein:

said primary and secondary host computers are responsive to said mode switch request message, said primary host computer switches said primary workstation controller from being primary to being secondary, said secondary host computer switches said secondary workstation controller from being secondary to being primary.

9. A computer system, as in claim 7, wherein:

said primary host computer switches from being primary to being secondary on receipt of said mode switch request message from said secondary host computer, and said secondary host computer switches from being secondary to being primary on receipt of said mode switch request message from said secondary workstation controller.

10. A computer system, as in claim 8, wherein:

said primary host computer switches from being primary to being secondary on receipt of said mode switch request message from said secondary host computer, and said secondary host computer switches from being secondary to being primary on receipt of said mode switch request message from said secondary workstation controller.

11. A computer system, as in claim 9, wherein:

said workstation controllers have impedance matching impedances which function as driver resistors when the workstation controllers are operating in the control mode and function as line terminating resistors when the workstation controllers are operating in the standby mode.

12. A computer system, as in claim 10, wherein:

said workstation controllers have impedance matching impedances which function as driver resistors when the workstation controllers are operating in the control mode and function as line terminating resistors when the workstation controllers are operating in the standby mode.

* * * * *

UNITED STATES PATENT AND TRADEMARK OFFICE
CERTIFICATE OF CORRECTION

PATENT NO. : 5,058,056

DATED : October 15, 1991

INVENTOR(S) : William E. Hammer and Harold F. Kossman

It is certified that error appears in the above-identified patent and that said Letters Patent is hereby corrected as shown below:

ON THE TITLE PAGE, ITEM [54], AND IN COLUMN 1, LINE 1,
CORRECT THE TITLE TO READ AS FOLLOWS:
    SYSTEM HAVING SECONDARY WORKSTATION CONTROLLER WITH FAULT DETECTION

CORRECT THE ABSTRACT BY ADDING THE FOLLOWING TWO SENTENCES TO THE END
OF THE ABSTRACT:

The primary or controlling workstation controller and the secondary
   or standby workstation controller are each connected to an associated
   host computer which furnishes the poll list for polling the
   workstations.  The associated host computers are connected to
   communicate with each other via a communications link.

Signed and Sealed this

Second Day of November, 1993

*Attest:*

BRUCE LEHMAN

*Attesting Officer*     Commissioner of Patents and Trademarks